US011861739B2

(12) United States Patent
Meerkov et al.

(10) Patent No.: US 11,861,739 B2
(45) Date of Patent: Jan. 2, 2024

(54) PROGRAMMABLE MANUFACTURING ADVISOR FOR SMART PRODUCTION SYSTEMS

(71) Applicant: THE REGENTS OF THE UNIVERSITY OF MICHIGAN, Ann Arbor, MI (US)

(72) Inventors: Semyon M. Meerkov, Ann Arbor, MI (US); Pooya Alavian, Ann Arbor, MI (US); Liang Zhang, Ellington, CT (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 679 days.

(21) Appl. No.: 16/656,528

(22) Filed: Oct. 17, 2019

(65) Prior Publication Data

US 2020/0126167 A1 Apr. 23, 2020

Related U.S. Application Data

(60) Provisional application No. 62/747,190, filed on Oct. 18, 2018.

(51) Int. Cl.
*G06Q 10/00* (2023.01)
*G06Q 50/00* (2012.01)
(Continued)

(52) U.S. Cl.
CPC ......... *G06Q 50/04* (2013.01); *G05B 19/4188* (2013.01); *G06N 5/04* (2013.01);
(Continued)

(58) Field of Classification Search
CPC ............................................. G06Q 10/00–50/00
(Continued)

(56) References Cited

U.S. PATENT DOCUMENTS 5,978,593 A 11/1999 Sexton
2015/0105887 A1* 4/2015 Troy ................ G05B 19/41865
700/97

(Continued)

OTHER PUBLICATIONS

Alavian, Pooya & Eun, Yongsoon & Meerkov, Semyon & Zhang, Liang. (2019). Smart production systems: automating decision-making in manufacturing environment. International Journal of Production Research. 1-19. 10.1080/00207543.2019.1600765.
(Continued)

*Primary Examiner* — Mustafa Iqbal
(74) *Attorney, Agent, or Firm* — Harness, Dickey & Pierce, P.L.C.

(57) ABSTRACT

A programmable manufacturing advisor includes an information unit that receives measurements for at least one parameter of each operation of a plurality of operations in the manufacturing process, and an analytics unit that determines a baseline performance metric for the manufacturing process based on the measurements of the at least one parameter. The programmable manufacturing advisor also includes an optimization unit that determines a recommended improvement action by determining a predicted performance metric for the manufacturing process based on an adjusted value of the at least one parameter and comparing the predicted performance metric to the baseline performance metric. The optimization unit also automatically presents the recommended improvement action to the operations manager.

27 Claims, 17 Drawing Sheets

(51) Int. Cl.
*G06N 7/01* (2023.01)
*G06N 5/04* (2023.01)
*G06Q 50/04* (2012.01)
*G05B 19/418* (2006.01)
*G06Q 10/0639* (2023.01)
*G06Q 10/0633* (2023.01)
*G06Q 10/0631* (2023.01)

(52) U.S. Cl.
CPC ........... *G06N 7/01* (2023.01); *G06Q 10/0633* (2013.01); *G06Q 10/06316* (2013.01); *G06Q 10/06393* (2013.01); *G05B 2219/32128* (2013.01); *G05B 2219/33002* (2013.01); *G05B 2219/40335* (2013.01)

(58) Field of Classification Search
USPC .......................................................... 706/11
See application file for complete search history.

(56) References Cited

U.S. PATENT DOCUMENTS

| | | | |
|---|---|---|---|
| 2018/0196409 A1* | 7/2018 | Ben-Bassat | G06F 16/23 |
| 2019/0266575 A1* | 8/2019 | McAdam | G06Q 10/06316 |
| 2019/0370646 A1* | 12/2019 | Rana | G06F 9/455 |
| 2020/0004219 A1* | 1/2020 | Wang | G06Q 50/04 |

OTHER PUBLICATIONS

Li, Jingshan and Semyon M. Meerkov. "Production Systems Engineering." (2008), pp. 1-674.

Alavian, Pooya, et al. "9th International Conference MIM." The (Alpha, Beta)-Precise Estimates of MTBF and MTTR: Definitions, Calculations, and Induced Effect on Machine Efficiency Evaluation, 2019, pp. 1-6.

* cited by examiner

Scenario 1

Target performance metric: TP
Goal: 37 JPH

Constraints:
Decrease MTTR of *at most 1* machine(s) by at most *15.0%*.

Scenario 2

Target performance metric: TP
Goal: 37 JPH

Constraints:
Decrease MTTR of *at most 1* machine(s) by at most *15.0%*.
Decrease cycle time of *at most 1* machine(s) by at most *8.0%*.

Scenario 3

Target performance metric: TP
Goal: Maximize

Constraints:
Rebuild *1* machine(s).

Scenario 4

Target performance metric: TP
Goal: Maximize

Constraints:
Decrease total MTTR by *280.0* seconds.

FIG. 5B

MEASURED PRODUCTIVITY IMPROVEMENT

Comparison of Predicted and Measured TP

|  |  | TP of Period 0 | TP of Period 1 | TP Improvement |
|---|---|---|---|---|
| Scenario 1 | Predicted | 34.61 JPH | 36.05 JPH | 1.44 JPH |
| | Measured | 33.38 JPH | 35.39 JPH | 2.01 JPH |
| Scenario 2 | Predicted | 34.61 JPH | 37.16 JPH | 2.55 JPH |
| | Measured | 33.38 JPH | 36.08 JPH | 2.70 JPH |
| Scenario 3 | Predicted | 34.61 JPH | 38.20 JPH | 3.59 JPH |
| | Measured | 33.38 JPH | 37.35 JPH | 3.97 JPH |
| Scenario 4 | Predicted | 34.61 JPH | 45.27 JPH | 10.66 JPH |
| | Measured | 33.38 JPH | 43.75 JPH | 10.37 JPH |

FIG. 8

PROGRAMMABLE MANUFACTURING ADVISOR FOR SMART PRODUCTION SYSTEMS

CROSS-REFERENCE TO RELATED APPLICATIONS

This application claims the benefit of U.S. Provisional Application No. 62/747,190, filed on Oct. 18, 2018. The entire disclosure of the application referenced above is incorporated herein by reference.

GOVERNMENT CLAUSE

This invention was made with government support under Grant No. 70NANB17H214 awarded by the National Institute of Standards and Technology and Grant No. CMMI-1160968 awarded by the National Science Foundation. The Government has certain rights in this invention.

FIELD

The present disclosure relates to a programmable manufacturing advisor for smart production systems.

BACKGROUND

A manufacturing process may transform raw materials into useful products. The manufacturing process may have a plurality of operations that may be modeled as machines. Throughput of the manufacturing process refers to an average number of parts produced by the last machine over a predetermined period of time during steady state operation of the manufacturing process. Typically, a nominal throughput (e.g., the throughput when no machine breakdowns or quality issues occur) is greater than an actual throughput (e.g., the throughput under random machine breakdowns or quality issues), which may result in missed daily schedules, economic losses, and material/energy waste.

This section provides background information related to the present disclosure which is not necessarily prior art.

SUMMARY

This section provides a general summary of the disclosure, and is not a comprehensive disclosure of its full scope or all of its features.

In one example in accordance with the present disclosure, a programmable manufacturing advisor that automatically presents recommended actions for achieving a desired productivity improvement for a manufacturing process to an operations manager is provided. The example programmable manufacturing advisor includes an information unit that receives measurements for at least one parameter of each operation of a plurality of operations in the manufacturing process, and an analytics unit that determines a baseline performance metric for the manufacturing process based on the measurements of the at least one parameter. The programmable manufacturing advisor also includes an optimization unit that determines a recommended improvement action by determining a predicted performance metric for the manufacturing process based on an adjusted value of the at least one parameter and comparing the predicted performance metric to the baseline performance metric. The optimization unit also automatically presents the recommended improvement action to the operations manager.

In one aspect, the information unit generates a mathematical model of each operation in the plurality of operations based on the measurements of at least one parameter, and the optimization unit determines the predicted performance metric based on the adjusted value of the at least one parameter using the mathematical model.

In another example in accordance with the present disclosure, a method of recommending a productivity improvement action to achieve a desired productivity improvement for a manufacturing process is provided. The method includes electronically receiving measurements for at least one parameter of each operation of a plurality of operations in the manufacturing process and determining a baseline performance metric for the manufacturing process based on the measurements of the at least one parameter. The method also includes determining a predicted performance metric for the manufacturing process based on an adjusted value of the at least one parameter and comparing the predicted performance metric to the baseline performance metric to determine a recommended improvement action. The method then includes electronically displaying the recommended improvement action to an operations manager.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5B is an example summary of scenarios screen of the PMA;

FIG. 8 is an example measured productivity improvement screen of the PMA;

Corresponding reference numerals indicate corresponding parts throughout the several views of the drawings.

DETAILED DESCRIPTION

Example embodiments will now be described more fully with reference to the accompanying drawings.

An operations manager, who manages a production system, may want to improve the performance of a manufacturing process or production system. The production system performance can be measured using one or more performance metrics (e.g., throughput, production lead time, product quality, customer demand satisfaction, etc.). The operations manager may want to improve one or more of such performance metrics. Specific improvement actions can be difficult to determine because of the complexity of production systems and the time required to determine which action, of multiple possible actions, should be taken by an operations manager to gain the desired performance improvements. The programmable manufacturing advisor (PMA) of the present disclosure can automatically and continuously determine a recommended improvement action that can be implemented by the operations manager. The PMA may use automated real-time measurements coupled with rigorous analytics applied to a mathematical model in order to calculate optimal steps for achieving the desired productivity improvement and offer these steps as advice to the operations manager without requiring that the operations manager be knowledgeable in these analytics. Thus, the PMA may be a knowledge automation device or tool, or an automated decision advisor device, for use in the manufacturing space. Examples regarding the analytics that may be used by the PMA to calculate the optimal steps may be found in the following book, which is incorporated by reference in its entirety: Li, Jingshan and Semyon M. Meerkov. "Production Systems Engineering." (2008), hereafter referred to as "Production Systems Engineering".

For example, one way to improve a production system may be to increase throughput. The operations manager may ask questions such as—what are the major causes of production losses or how can a desired throughput be achieved in an optimal manner (e.g., making minimal changes to the production system's equipment and/or workforce). Such questions are common in manufacturing practice and are answered by the operations manager before any changes can be made to the production system. The programmable manufacturing advisor (PMA) may automatically monitor the production system and provide optimal continuous improvement recommendations to the operations manager, leading to a desired productivity improvement. The PMA may be configured for different production systems (e.g., serial lines, assembly systems, multi-job manufacturing, etc.) and for improvement of various performance metrics (e.g., throughput, production lead time, product quality, customer demand satisfaction, etc.).

Figure 1:
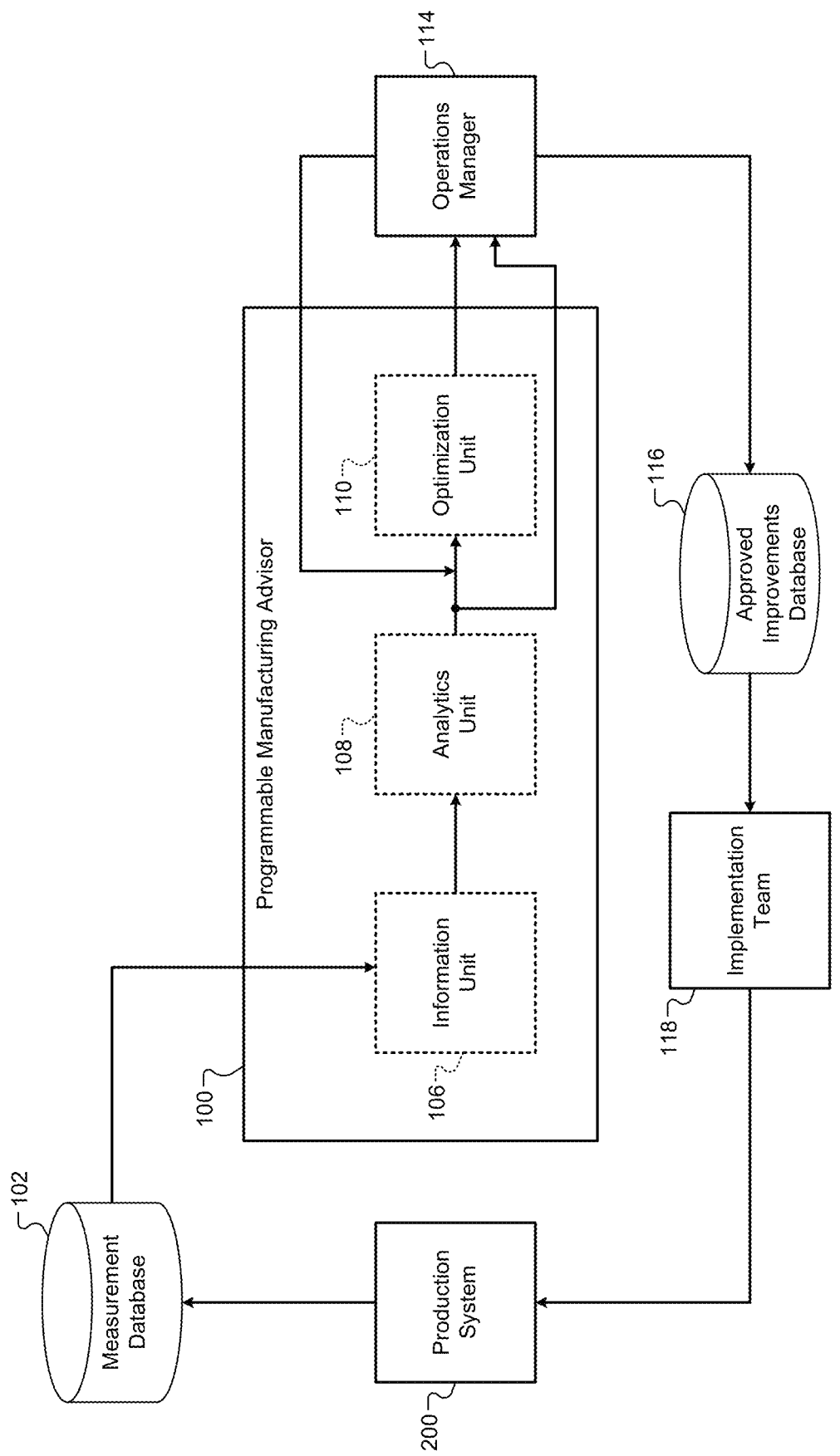
FIG. 1 is a block diagram of an example smart production system utilizing a programmable manufacturing advisor (PMA) according to some embodiments of the present disclosure.

Referring now to FIG. 1, a block diagram illustrating an example programmable manufacturing advisor (PMA) 100 is presented. The PMA 100 may monitor the production system 200 and automatically provide optimal continuous improvement recommendations to an operations manager 114 for achieving productivity improvements of the production system 200. The PMA 100, in the example shown, includes an information unit 106, an analytics unit 108, and an optimization unit 110.

The PMA 100 is coupled to the production system 200 and electronically receives information and/or measurements regarding the operation of the production system 200. A measurement database 102 can be used to collect and store the information and/or measurements regarding the production system 200. The PMA 100 can electronically receive the information and/or measurements from the production system 200 via the measurement database 102. As further described herein, the PMA 100 can transform, filter, analyze and/or otherwise process the information and/or measurements from the production system 200 to continuously and automatically deliver recommended improvement actions to the operations manager 114. While the present disclosure describes the interactions of the operations manager 114 with the PMA 100, any user can interact with the PMA 100. It should be appreciated that the term "operations manager" can include other users of the PMA 100 such as engineers, factory superintendents, plant managers, production supervisors, consultants, and the like.

As shown, the PMA 100 includes the information unit 106, the analytics unit 108 and the optimization unit 110. The information unit 106 may perform the functions of receiving measurements or other information regarding the production system 200. The information unit 106 may clean, transform, filter or otherwise manipulate the measurement data for further use by the PMA 100. The information unit 106 may also include the functionality of validating a mathematical model of the production system 200.

The analytics unit 108, as further described below, can include functionality that includes performance analysis, system diagnostics, what-if analysis, and system health. The optimization unit 110 can include functionality to optimize possible changes to the production system 200 and to determine and present optimized performance improvements for the production system 200. The PMA 100, including the information unit 106, the analytics unit 108 and the optimization unit 110, can operate to continuously and automatically deliver recommended performance improvements for the production system 200 to the operations manager 114. Additional details describing the functionality and/or structure of the PMA 100 can be found in the following paper, the contents of which are hereby incorporated by reference in its entirety: Alavian, Pooya & Eun, Yongsoon & Meerkov, Semyon & Zhang, Liang. (2019). Smart production systems: automating decision-making in manufacturing environment. International Journal of Production Research. 1-18. 10.1080/00207543.2019.1600765. In one example, the PMA 100 is installed on the factory floor and is in the form of a server and interactive display. In other examples, the PMA 100 can have other forms and/or can be installed remotely from the factory floor, for example. In still other examples, one or more components of the PMA 100 can be installed on the factory floor and one or more components of the PMA 100 can be installed remotely from the factory floor. For example, the information unit 106 and the analytics unit 108 may be in the form of a cloud server installed remotely from the factory floor, and the optimization unit 110 may be in the form of a server and interactive display installed on the factory floor.

The PMA 100 may be used in connection with a manufacturing process or production system 200 as shown in FIG.

2A. The operations manager 114 may generate a structural model of the production system 200 using an interface of the PMA 100 such as the one shown in FIG. 3A. For example, the operations manager 114 may generate the structural model using the information unit 106. Each operation in the plurality of operations 204 may be modeled to a corresponding machine in the structural model, as described in FIG. 2B.

Figure 2A:
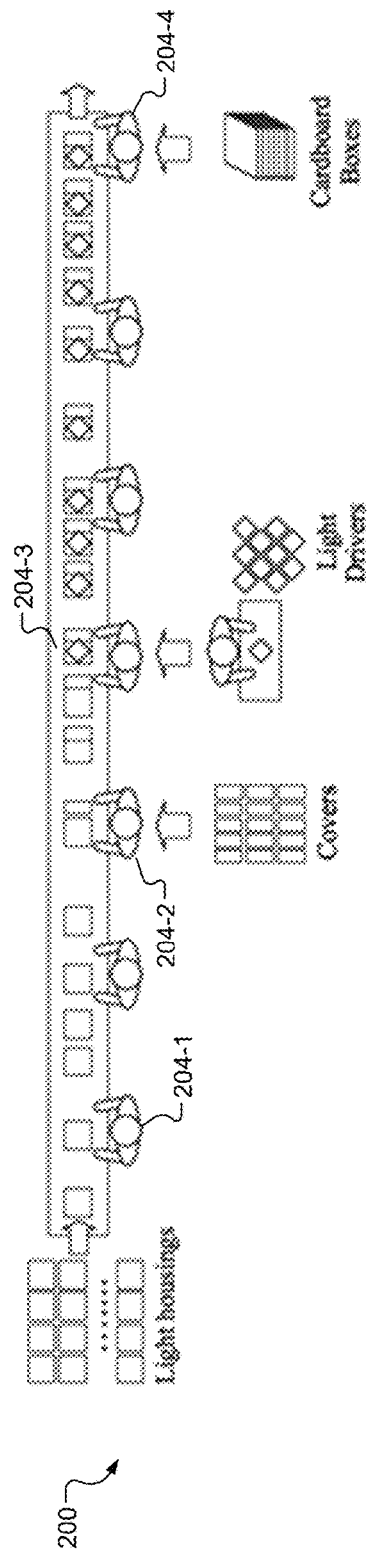
FIG. 2A is a schematic illustrating an example layout of a production system according to some embodiments of the present disclosure.

In the example of FIG. 2A, the production system 200 may be of a streetlight production system. The production system 200 may include a plurality of operations 204, such as an operation 204-1 of unloading light housings onto a conveyor, an operation 204-2 of adding covers to the light housings, an operation 204-3 of adding light drivers to the light housings, and an operation 204-4 of packaging. Although FIG. 2A illustrates seven operations, the production system 200 may include more or fewer operations. Furthermore, although the production system 200 is shown and described for a streetlight production system, it should be appreciated that other types of production systems, such as automotive underbody assembly production systems, hot-dip galvanization production systems, etc., may be used to reference the production system 200.

Figure 2B:
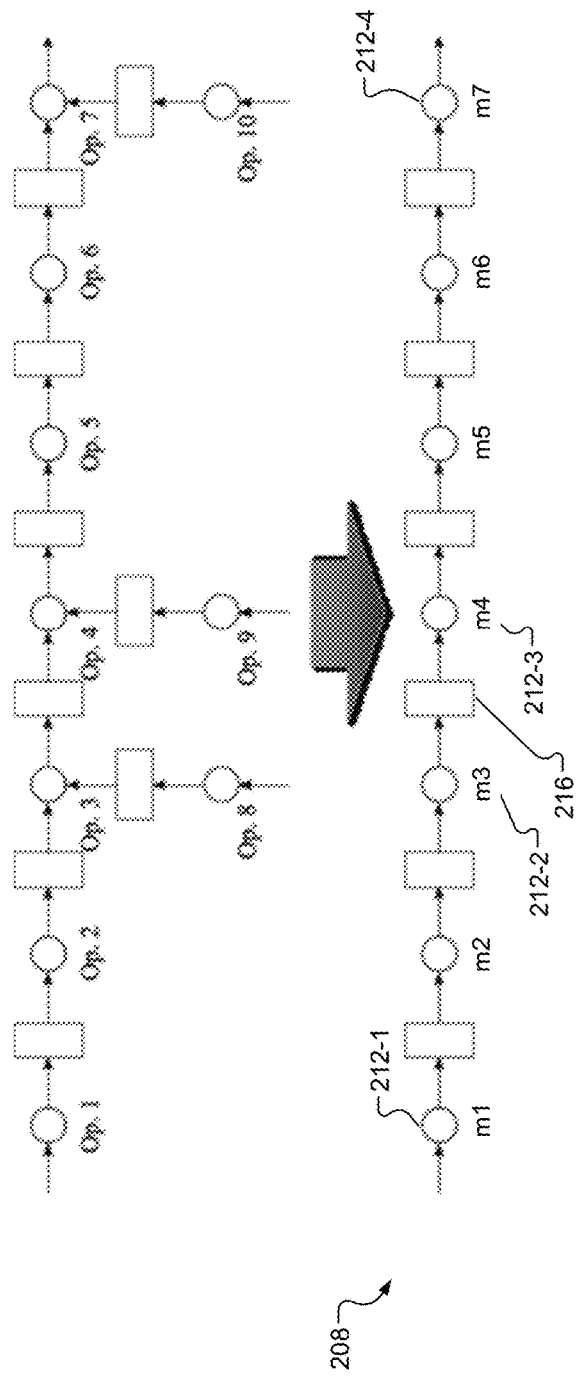
FIG. 2B is a schematic illustrating a structural model of the production system illustrated in FIG. 2A.
Figure 3A:
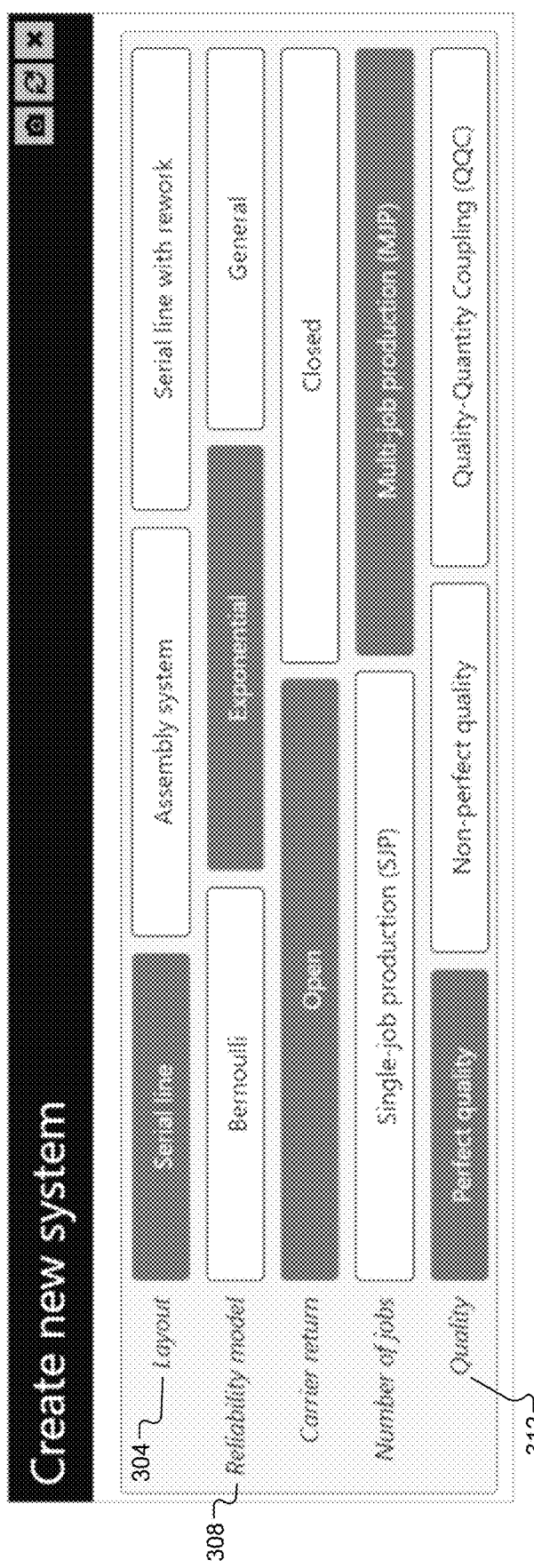
FIG. 3A is an example input screen used to create the structural model in the PMA.

Referring now to FIG. 2B, a schematic illustrating a structural model 208 of the production system 200 is presented. The structural model 208 is a simplified model that maps physical components (e.g., plurality of operations 204, stations, storage areas, conveyors, etc.) of the production system 200 to standard production system entities (e.g., machines and buffers). Each operation in the plurality of operations 204 may be modeled to a corresponding machine. For example, the operation 204-1 of unloading the light housings may correspond to machine one 212-1 in the structural model 208. Certain operations may be merged into a single machine, such as when the operation receives raw materials from a storage area. For example, the operation 204-2 of adding covers to the light housings may be associated with operation three and operation eight. Since operation three receives covers from operation eight (e.g., storage area), operation three and operation eight may be merged into machine three 212-2 in the structural model 208. Similarly, the operation 204-3 of adding light drivers to the light housings may be associated with operation four and operation nine, and may merge into machine four 212-3 in the structural model 208. Moreover, the operation 204-4 of packaging may be associated with operation seven and operation ten, and may merge into machine seven 212-4 in the structural model 208.

A buffer 216 may be interposed between each of the plurality of operations 204. The buffer 216 is a quantity of work-in-process that prevents a blockage and/or a starvation. For example, the buffer 216 may include boxes that store work-in-process, conveyors, silos, robotic storage devices, automated guided vehicles, etc. Circles in FIG. 2B are representative of machines and rectangles are representative of buffers.

While not shown in FIG. 2A, the physical (or actual) production system 200 may further include sensors that measure parameters of each operation in the plurality of operations 204. The parameters may include (but are not limited to) cycle time, MTBF, and MTTR. The cycle time is an amount of time needed to process a part by a machine. The MTBF is an average up-time of a machine and the MTTR is an average down-time of a machine. A measurement database 102 can electronically receive and store real-time measurements of the parameters from the sensors. In various implementations, the measurement database 102 may electronically receive real-time measurements from programmable logic controllers (PLCs) located within a machine, for example.

In an example embodiment, the information unit 106 utilizes automated manufacturing principles (e.g., Industry 4.0) to monitor the parameters of the production system 200. For each operation in the plurality of operations 204, the information unit 106 electronically receives real-time measurements of the parameters from the measurement database 102. The information unit 106 may filter the received measurements by removing outliers and catastrophic events to provide more accurate measurement data.

The information unit 106 may generate a mathematical model of the production system 200 that associates the structural model with various parameters including the parameters (e.g., cycle time, MTBF, and MTTR), buffer parameters (e.g., buffer capacity), and other system parameters (e.g., product mix, number of carriers, etc.). In the example embodiment, each operation is mathematically modeled with cycle time, MTBF, and MTTR; and each buffer is mathematically modeled with buffer capacity. Each operation is mathematically modeled with the same parameters. The information unit 106 may be further configured to validate the mathematical model to verify that the mathematical model accurately represents the production system 200, as described below in FIG. 11.

The analytics unit 108 computes performance metrics and diagnoses system health of the production system 200. The analytics unit 108 includes performance analysis, system diagnostics, what-if analysis, and system health. In the example embodiment, the performance analysis computes the performance metrics of the production system 200. Example performance metrics may include (but are not limited to) at least one of a throughput, a production rate, a work-in-process, a blockage probability, a starvation probability, and a lead-time. The performance metrics may be computed using the mathematical model received from the information unit 106. Details regarding how to compute the performance metrics may be found in Production Systems Engineering.

The throughput is an average number of parts produced by the last machine over a predetermined period of time during steady state operation of a production system. The work-in-process is an average number of parts contained in a buffer during steady state operation of a production system. The blockage probability is a probability that a given machine is up, a buffer of the given machine is full, and a subsequent machine does not take a part from the buffer of the given machine. The starvation probability is a probability that a given machine is up and a buffer preceding the given machine is empty.

The system diagnostics computes digested system diagnostics using the performance metrics. The operations manager 114 may use the computed digested system diagnostics to identify causes of productivity losses in the production system 200 and identify potential actions for improvement. The digested system diagnostics include throughput loss, location of a bottleneck, and buffering potency. The throughput loss is an amount of loss in throughput due to various factors, such as machine failure, buffering deficiency, lack of carriers, quality, etc. The throughput loss may be computed by subtracting the actual throughput from a nominal throughput. The nominal throughput is the throughput when all resources are unconstrained (e.g., no machine failures, no quality issues, infinite buffers, no impedance due to carriers, etc.). The bottleneck occurs at a machine that affects the throughput the most (not necessarily the machine with the lowest stand-alone throughput or the highest utilization). The buffering potency is a measure of a buffer's effectiveness.

Before performing any potential actions for improvement of the production system 200, it may be important to know what effect modifying the parameters may have on the performance metrics. What-if analysis allows the operations manager 114 to explore the effects of various potential actions for improvement. For example, the operations manager 114 may select any parameter and adjust the range of values of the selected parameter. The resulting performance metric may be presented to the operations manager 114, for example, on an interactive graph.

The system health generates and presents (e.g., electronically displays) a dashboard that provides an overview of the performance metrics with color-coded indicators (e.g., red=bad, yellow=caution-needed, green=good) showing the health status of the performance metrics. Using the system health, the operations manager 114 can quickly assess the health status of the production system 200 and identify potential actions for improvement.

The optimization unit 110 allows the operations manager 114 to create one or more scenarios that improve the performance metric(s) and achieve a desired improvement. Each scenario includes a desired productivity improvement and an admissible action space. In the example embodiment, the operations manager 114 may enter a desired value (or range) of the performance metric in the desired productivity improvement or request that the performance metric be minimized/maximized by placing constraints on the parameters under the admissible action space. The optimization unit 110 optimizes multiple scenarios simultaneously allowing the operations manager 114 to compare different improvements in parallel. For example, the optimization unit 110 may determine the feasibility of each scenario using Artificial Intelligence (AI) inspired optimization algorithms. In the example embodiment, the optimization unit 110 may present the feasibility of each scenario to the operations manager 114. For example, a scenario that is able to successfully achieve the desired value is indicated by a green-colored report card, meanwhile a scenario that is unsuccessful in achieving the desired value is indicated by a red-colored report card.

In the example embodiment, the optimization unit 110 may determine the optimal steps to achieve the desired value specified in each scenario, for example, using system performance evaluation algorithms, as described below in FIG. 10. A list of detailed steps that describe how to modify the parameters to achieve the desired value of each selected scenario is provided for each successful solution. For each unsuccessful solution, a list of steps to achieve the best attainable performance metric is provided.

The operations manager 114 may select and approve a desirable scenario. The desirable scenario is stored in an approved improvements database 116. An implementation team 118 may implement the desirable scenario. The implementation team 118 may reconfigure a particular machine based on steps listed in the desirable scenario. For example, the implementation team 118 may reconfigure the particular machine by rebuilding the machine, adjusting cycle time of the machine, assigning skilled trade worker priority, modifying a buffer, modifying raw materials release policy, etc. After the desirable scenario is implemented, the operations manager 114 may compare the predicted productivity improvement with the actual productivity improvement of the implemented actions.

Figure 9:
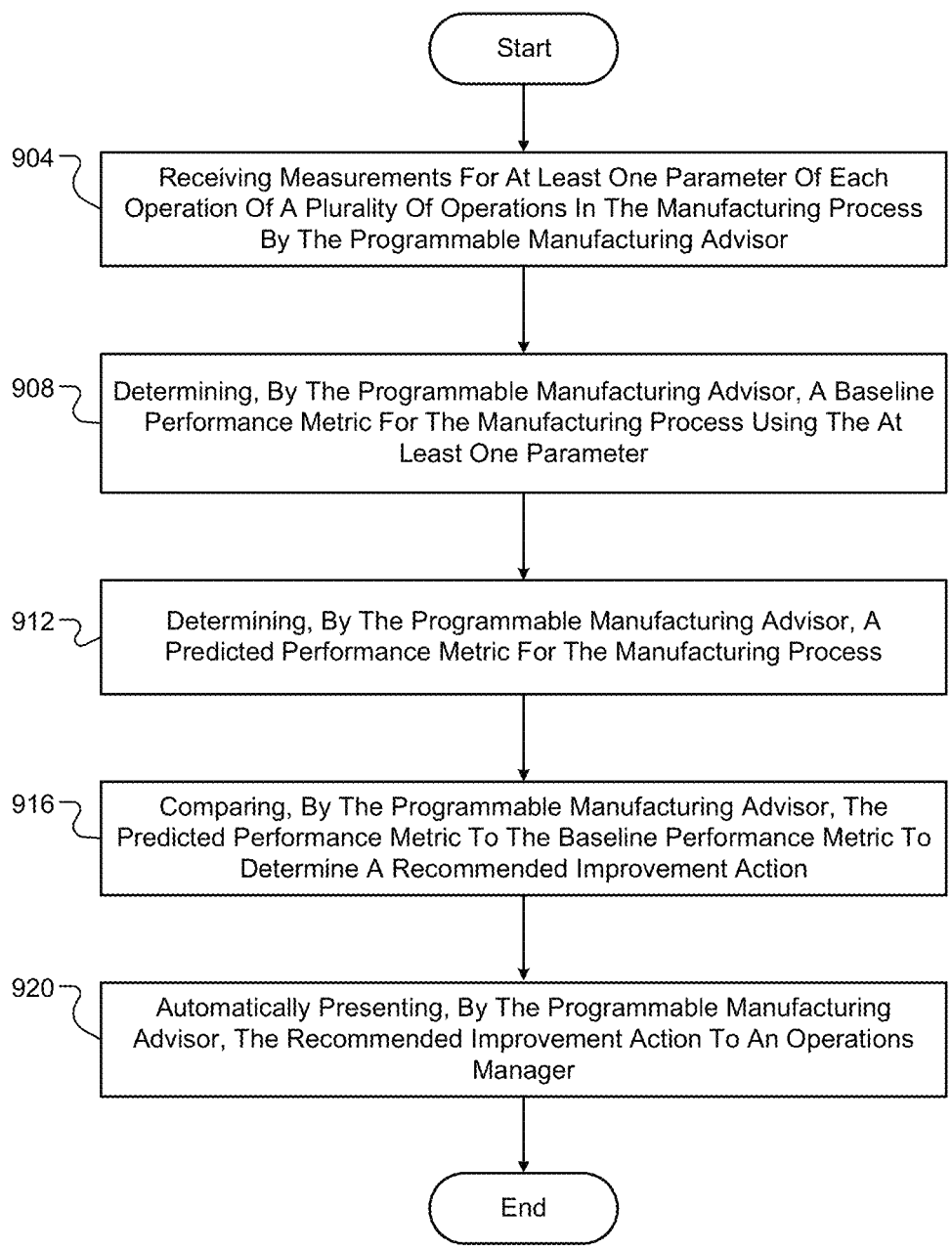
FIG. 9 is a flowchart illustrating an exemplary method for recommending a productivity improvement for a manufacturing process.

Referring now to FIG. 9, a flowchart illustrating an exemplary method for recommending, by the programmable manufacturing advisor (PMA) 100, a productivity improvement for a manufacturing process is presented. Control begins at 904, where the PMA 100 electronically receives measurements for at least one parameter of each operation of the manufacturing process. As can be appreciated, the manufacturing process is partitioned into multiple operations and mathematically modeled by the PMA 100 prior to 904. The mathematical model of the manufacturing process can also be validated using a method as further described below and shown in FIG. 11. For example, the information unit 106 of the PMA 100 can electronically receive the measurements from the measurement database 102 and validate the mathematical model of the manufacturing process.

Control continues to 908, where the programmable manufacturing advisor (PMA) 100 determines a baseline performance metric for the manufacturing process using at least one parameter. In one example, the analytics unit 108 determines the baseline performance metric for the manufacturing process based on the measurements of the at least one parameter. Each operation in the plurality of operations is mathematically modeled with the same parameters, and the parameters, in one example, are selected from a group consisting of cycle time, mean time before failures (MTBF), and mean time to repair (MTTR). For example, each operation in the plurality of operations is modeled with at least one parameter in a mathematical model, as described below. The baseline performance metric that is determined at 908 provides a level of performance of the manufacturing process against which possible improvement actions can be judged in order to determine an improvement action that can deliver a desired performance improvement. The performance metric, for example, may include at least one of throughput, production rate, work-in-process, blockage probability, starvation probability, and lead time. In one example, the analytics unit 108 can determine the predicted performance metric for the manufacturing process.

Figure 5A:
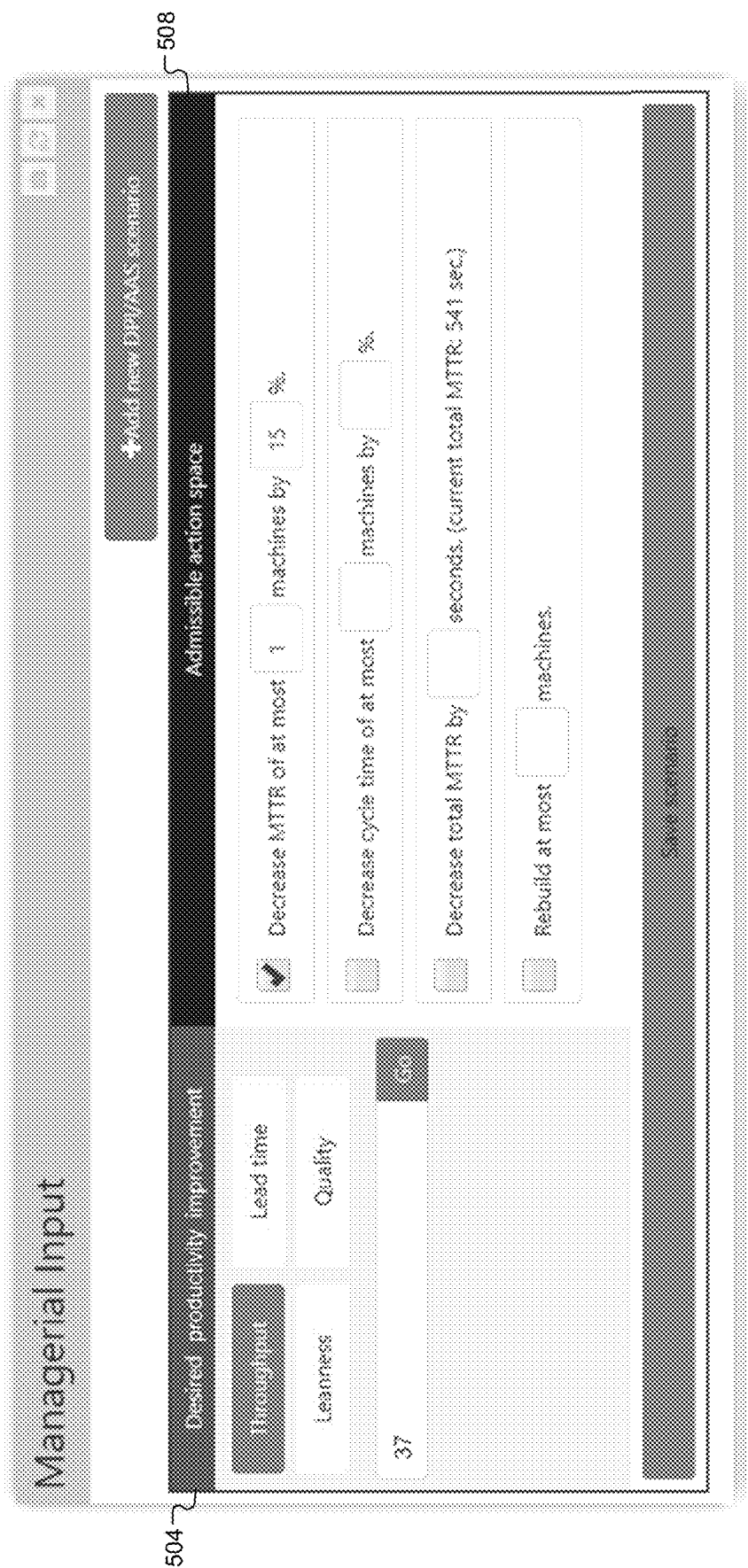
FIG. 5A is an example managerial input screen of the PMA.

Control continues at 912, where the PMA 100 determines a predicted performance metric for the manufacturing process. The predicted performance metric can be the same performance metric as the baseline performance metric. The predicted performance metric, for example, may include at least one of throughput, production rate, work-in-process, blockage probability, starvation probability, and lead-time. At 912, the PMA 100 can undertake one or more sub-processes to determine the performance metric. For example, the optimization unit 110 can undertake the steps described in FIG. 10 to determine the predicted performance metric. In addition to the method described in FIG. 10, the optimization unit 110 can electronically receive an indication of an admissible action space through a user input screen (FIG. 5A, for example). The optimization unit 110 can limit the recommended improvement action determined by the PMA 100 to an action bounded by the admissible action space. The admissible action space can, for example, include a limitation of at least one of the parameters used to mathematically model the manufacturing process.

At 912 (and as further described in FIG. 10), the optimization unit 110 can vary one or more of the parameters used to mathematically model the manufacturing process and compute one or more performance metrics based on the varied parameters using the mathematical model. The optimization unit 110 can determine which parameter to vary using any suitable algorithm such as identifying a bottleneck as shown in FIG. 10. The PMA 100 can also receive an indication of a predetermined performance metric threshold.

Such predetermined performance metric threshold can be electronically received through an input interface of the PMA 100. The predetermined performance metric threshold can be a value or a range that describes a desired improvement of the manufacturing process.

At 916, the PMA 100 compares the predicted performance metric for the manufacturing process to the baseline performance metric. The optimization unit 110 can perform this comparison. As part of 916, the optimization unit 110 can also compare the difference between the predicted performance metric and the baseline performance metric to the predetermined performance metric threshold. Alternatively, the optimization unit 110 can compare different alternative improvement actions to determine which improvement action results in the greatest performance improvement to the performance metric. The PMA 100 can then select a recommended improvement action based on the difference between the baseline performance metric and the predicted performance metric.

Control continues to 920, where the PMA 100 automatically presents the recommended improvement action to the operations manager 114. For example, the PMA 100 may electronically display a list of detailed steps or actions to the operations manager 114. The detailed steps or actions indicate a target value for a particular parameter of a given operation in the plurality of operations. For example only, a step may indicate reducing cycle time of machine six from 59 seconds to 54 seconds in order to increase throughput of the manufacturing process.

The process as described above and shown in FIG. 9 can be an automatic and continuous process that can continuously provide recommended improvement actions and present such recommended improvement actions to the operations manager 114. Such automatic and continuous characteristic of the PMA 100, allows the operations manager 114 to receive information in real-time as changes may occur to the manufacturing process. Additionally, the operations manager 114 can focus efforts on the implementation of such recommended improvement actions and have confidence that such changes will cause the desired improvements.

Figure 10:
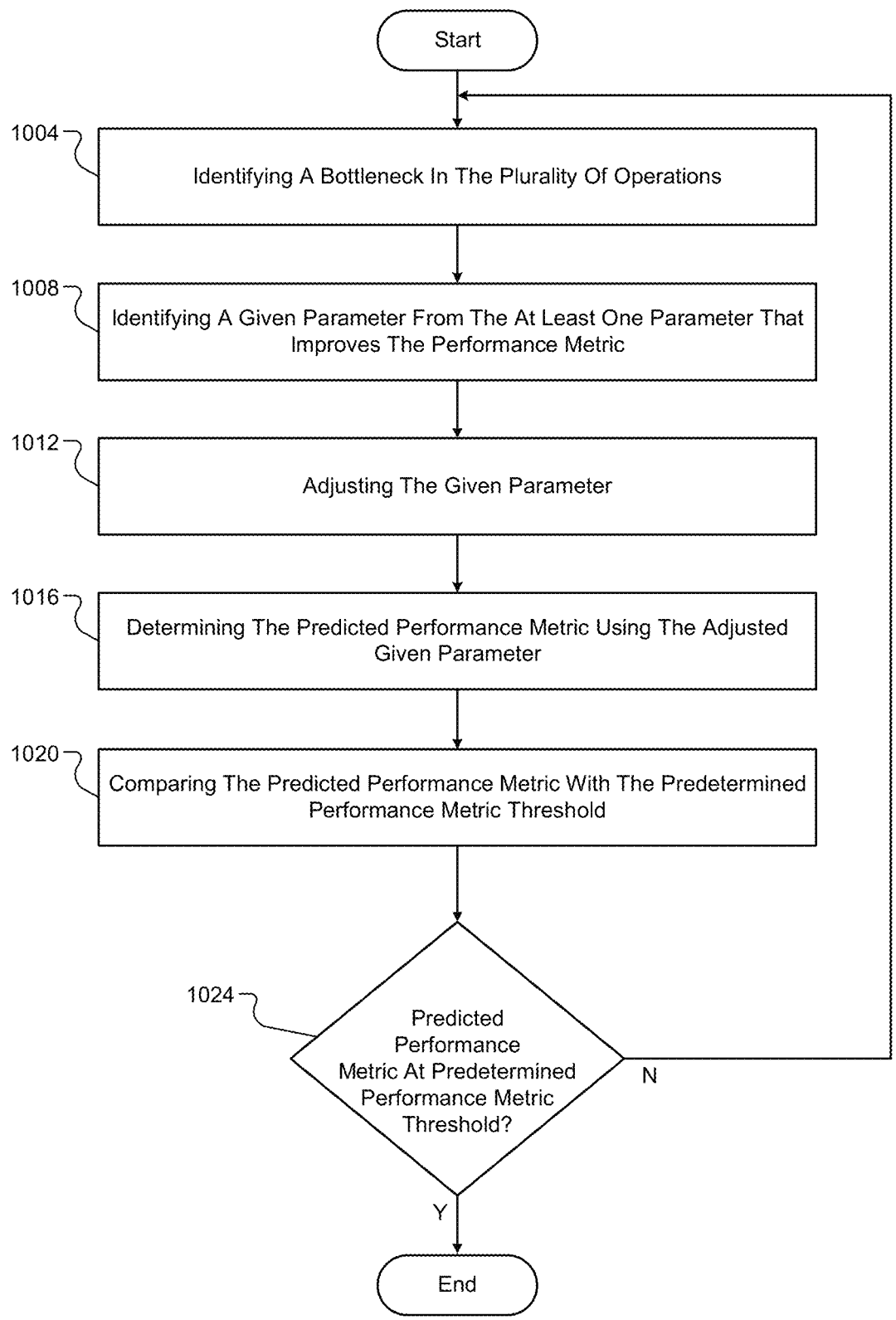
FIG. 10 is a flowchart illustrating an exemplary method for achieving a desired value for a performance metric.

FIG. 10 is a flowchart illustrating an exemplary method for determining a recommended improvement action as described above. The optimization unit 110, for example, can perform the method shown in FIG. 10. Control begins at 1004, where control identifies a bottleneck in the plurality of operations. To identify the bottleneck, control identifies the blockage probability and the starvation probability for each operation in the plurality of operations. The bottleneck occurs at a selected operation in the plurality of operations when (i) the blockage probability of a preceding operation is greater than the starvation probability of the selected operation and (ii) the blockage probability of the selected operation is less than the starvation probability of a subsequent operation.

Figure 4A:
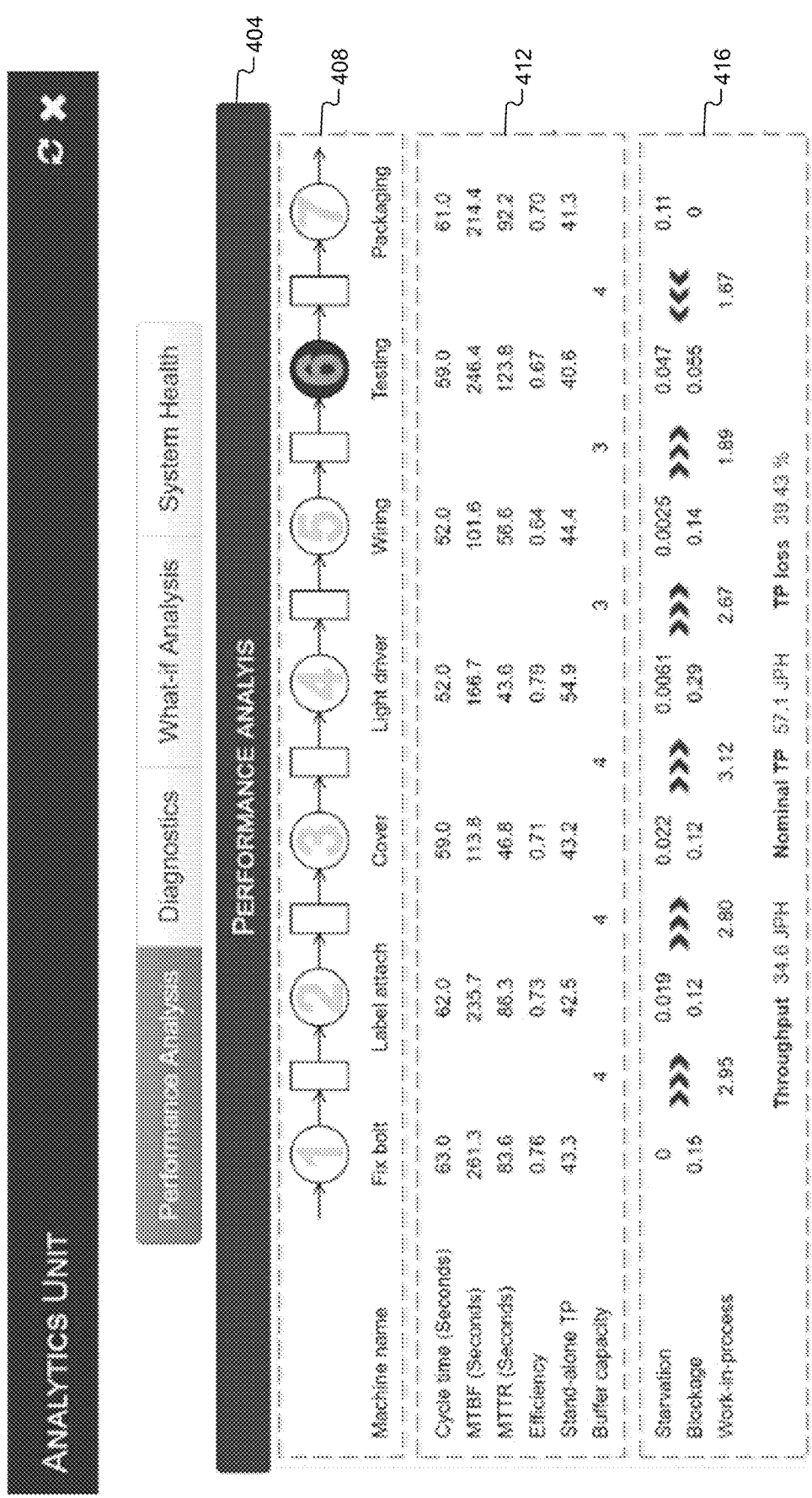
FIG. 4A is an example performance analysis screen of an analytics unit of the PMA.

In the example shown in FIG. 4A, each of the plurality of operations is modeled to a corresponding machine, such as a wiring operation corresponding to machine five, a testing operation corresponding to machine six, and a packaging operation corresponding to machine seven. For each of the machines, control identifies the blockage probability and the starvation probability according to the principles found in "Production Systems Engineering". Control compares the blockage probability of a given machine to the starvation probability of a subsequent machine. Machine five has a blockage probability of 0.14 and machine six has a starvation probability of 0.047. Since the blockage probability of machine five is greater than the starvation probability of machine six, an arrow is pointed rightwards (from machine five to six). Moreover, machine six has a blockage probability of 0.055 and machine seven has a starvation probability of 0.11. Since the blockage probability of machine six is less than the starvation probability of machine seven, an arrow is pointed leftwards (from machine seven to six). As such, control identifies that the bottleneck occurs at machine six when the arrow transitions from pointing rightward to pointing leftward (indicative of (i) the blockage probability of machine five being greater than the starvation probability of machine six and (ii) the blockage probability of machine six being less than the starvation probability of machine seven).

Referring back to FIG. 10, at 1008, control identifies a given parameter from the parameters of the bottleneck operation (e.g., cycle time, MTBF, and MTTR) that improves a performance metric (e.g., the baseline performance metric determined at 908). In order to identify a given parameter that improves the performance metric, a value of one of the parameters is varied slightly (e.g., by a small step size, such as 5%). The performance metric is recomputed using the varied value. The performance metric may be recomputed in the manner as described above by the analytics unit 108. Step 1008 may be repeated iteratively for the remaining parameters. Control may determine which of the parameters is the most effective in changing the performance metric.

In one example, when selecting a step size by which to vary a value of one of the parameters, control may limit the step size based on the admissible action space. For example, the admissible action space can include a maximum allowable range for one or more (e.g., all) of the parameters, and control may limit the step size for a parameter to maintain that parameter within its maximum allowable range (if applicable). Thus, if increasing or decreasing a parameter by 3% would respectively adjust the parameter to the upper end or lower end of its maximum allowable range, control may limit the step size for that parameter to 3%.

In the example shown in FIG. 4A, since the bottleneck occurs at machine six, cycle time of machine six may be decreased by three seconds (e.g., approximately 5%) from 59 seconds to 56 seconds. Next, the performance metric is recomputed using the cycle time of 56 seconds. The throughput may increase from 34.6 jobs per hour (JPH) to 34.7 JPH. Similarly, MTTR may be decreased slightly from 123.8 seconds to 117.6 and the throughput may increase from 34.6 JPH to 37 JPH. In this example, MTTR is the most effective parameter in changing the throughput.

Referring back to FIG. 10, once the given parameter is identified, control adjusts the given parameter (e.g., most effective parameter) for the bottleneck operation further (e.g., by a larger step size, such as 10-15%) at 1012. In the example above, control may adjust MTTR from 123.8 seconds to 105.2 seconds (e.g., approximately 15%). At 1016, control predicts or computes the performance metric based on the adjusted given parameter using the mathematical model of the bottleneck operation. The performance metric may be computed in the manner as described above by the analytics unit 108. At 1020, control compares the computed performance metric with a desired value or with a predetermined performance metric threshold for the performance metric. The desired value and/or the predetermined performance metric threshold for the performance metric can be received from the operations manager 114. At 1024, control determines whether the computed performance metric has reached the desired value or the predetermined performance metric threshold for the performance metric. If so, control presents (e.g., electronically displays) a list of steps (or actions) to the operations manager 114 and then ends; otherwise, control returns to 1004. The list of steps (or actions) indicate a target value for a particular parameter of a given operation in the plurality of operations, as described in FIG. 6. For example, the list of steps (or actions) may include adjusting the given parameter (e.g., most effective parameter) by a step size that achieves the desired value and/or the predetermined performance metric threshold for the performance metric. In addition, control may limit the recommended step size for the given parameter based on the admissible action space, which can include a limitation (e.g., a maximum value, a minimum value, a maximum allowable range) on the given parameter.

In one example, when selecting a step size by which to vary a value of the given parameter at 10212, control may limit the step size based on the admissible action space. For example, the admissible action space can include a maximum allowable range for one or more (e.g., all) of the parameters, and control may limit the step size for a parameter to maintain that parameter within its maximum allowable range (if applicable). Thus, if increasing or decreasing a parameter by 8% would respectively adjust the parameter to the upper end or lower end of its maximum allowable range, control may limit the step size for that parameter to 8%.

Figure 11:
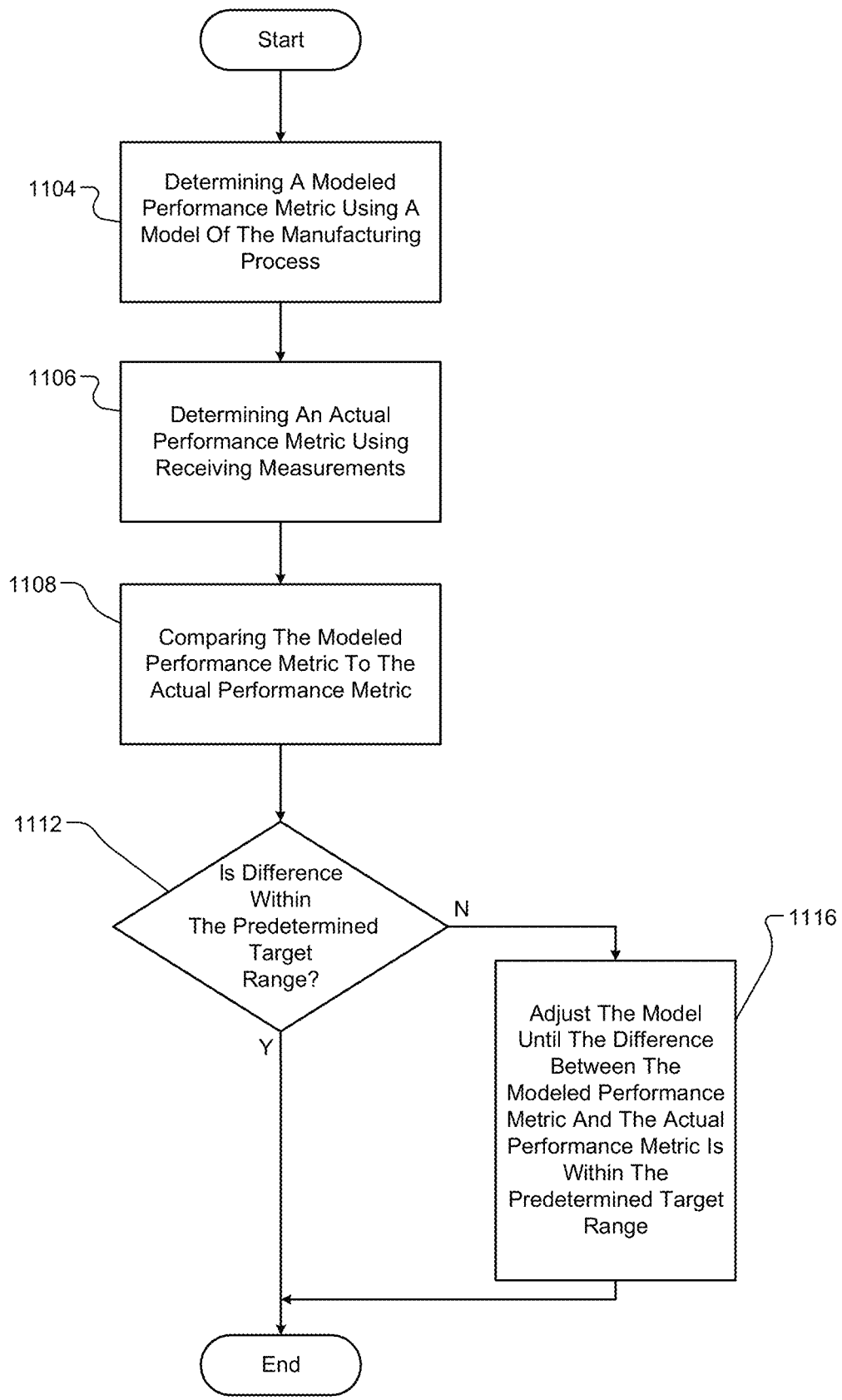
FIG. 11 is a flowchart illustrating an exemplary method for validating a mathematical model.

FIG. 11 is a flowchart illustrating an exemplary method for validating the mathematical model of the manufacturing process as performed by the information unit 106. Control begins at 1104, where control computes a modeled performance metric of the production system using a mathematical model of the manufacturing process. The mathematical model can be a model that is created as previously described. At 1106, control determines an actual performance metric using received measurements. Such measurements can be electronically received, for example, by the information unit 106 from the measurement database 102. At 1108, control compares the modeled performance metric with the actual performance metric computed by an analytics unit, such as the analytics unit 108. For example, control may compute a percent error using the predicted performance metric and the actual performance metric. At 1112, control determines whether the comparison is within a predetermined target range. For example, the predetermined target range may be ±5%. In various implementations, the predetermined target range may be ±10%. If the comparison is not within the predetermined target range, the mathematical model is adjusted until the desired accuracy is obtained at 1116. For example, adjusting the mathematical model may include changing one or more parameters or adding or subtracting an operation in the mathematical model, merging operations, or splitting merged operations. If the comparison is within the predetermined target range, the mathematical model is validated and control ends.

Referring back to FIG. 3A, an example of creating a structural model using the information unit 106 in the PMA 100 is presented. A user of the PMA 100, such as the operations manager 114 and/or a programmer, may create the structural model of a production system in the PMA 100. The structural model may reduce the plurality of operations to one of the standard types of production systems. The user may select a layout type 304 of the production system, a reliability model 308, a carrier return, number-of-jobs type, and quality features 312. The layout type 304 may include a serial line, an assembly system, or a serial line with rework. The reliability model 308 may include a Bernoulli model, an exponential model, or a general model. The quality features 312 may include perfect quality, non-perfect quality, or quality-quantity coupling.

Figure 3B:
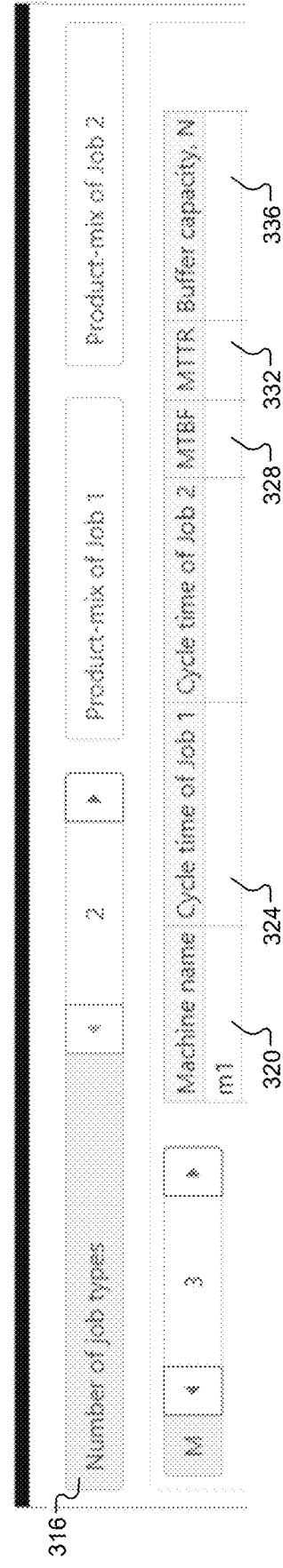
FIG. 3B is an example input screen used to create a mathematical model in the PMA.

Referring now to FIG. 3B, an example of creating a mathematical model using the information unit 106 in the PMA 100 is presented. The user may create the initial mathematical model by selecting the number of job types 316 that may correspond to the number of job types that may be produced by the production system. For each of the machines, the user may enter a machine name 320. Moreover, for each of the machines, the user may enter initial values for MTBF 328, MTTR 332, and buffer capacity 336. The user may also enter cycle time 324 for job type 316 for each machine. Any of the tasks involved in creating a structural or mathematical model using the information unit 106 may be performed by a programmer, and the results of the task may be stored in the information unit 106 so that a user such as the operations manager 114 does not need to have knowledge of analytics used to perform the tasks.

Figure 3C:
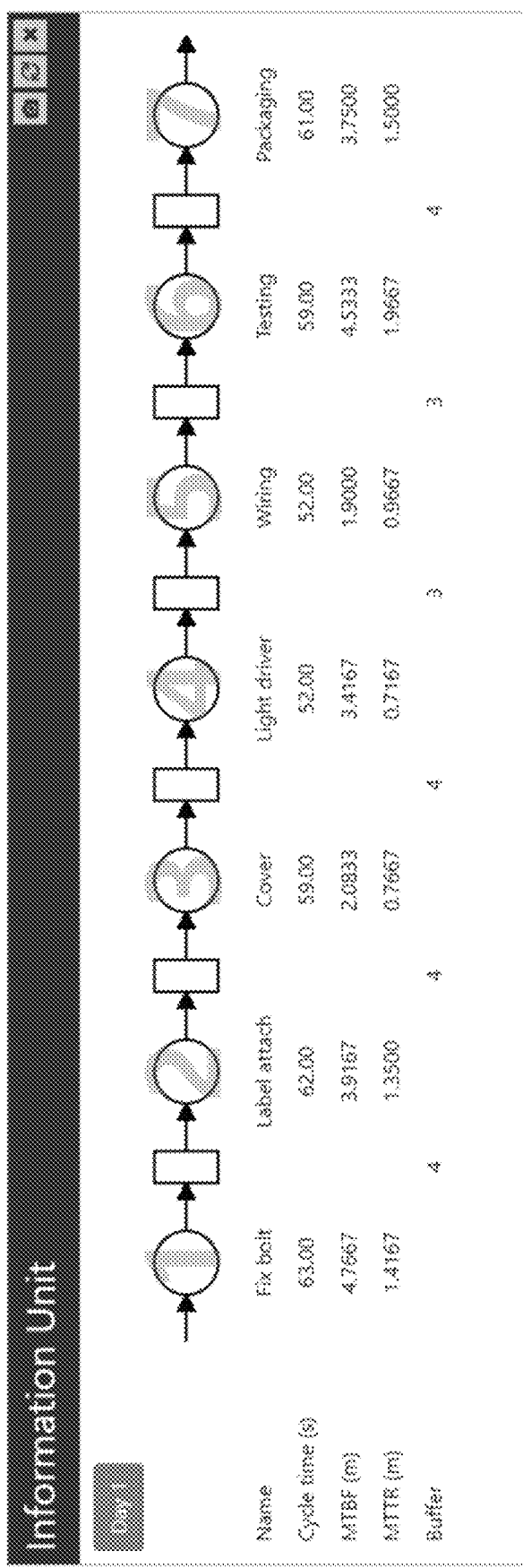
FIG. 3C is an example information unit screen of the PMA.

Referring now to FIG. 3C, an example information unit output screen of an information unit 106 of the PMA 100 is presented. In this example, after the structural model and the mathematical model have been created, the information unit output screen presents (e.g., electronically displays) the initial mathematical model and the structural model. For each machine, the initial mathematical model may include the initial values for the parameters that were entered into the mathematical model, as shown in FIG. 3B. The production system shown in this example is an asynchronous single-product serial line. The information unit may update the initial mathematical model at periodic intervals, such as once a day, once a week, once a month, etc., based on measurements received for each of the parameters. The information unit screen provides an updated mathematical model of the production system for the current day and four days in the past. The PMA 100 may automatically and continuously update and validate the mathematical model of the production system.

Referring now to FIG. 4A, an example performance analysis screen 404 of the analytics unit 108 of the PMA 100 is presented. The performance analysis screen 404 presents (e.g., electronically displays) the performance of the production system to the operations manager 114. The performance analysis screen 404 includes a structural model 408, a mathematical model 412, and performance metrics 416. The structural model 408 is shown for seven machines and each machine may be identified by a machine name. For each machine, the mathematical model 412 includes measurements for each of the parameters including the cycle time, MTBF, and MTTR. The mathematical model 412 may also include buffer parameters (e.g., buffer capacity) for each buffer. The performance metrics 416 may include a starvation and blockage probability for each machine, and a work-in-process for each buffer. The performance metrics 416 may also include an actual throughput, as well as a nominal throughput that corresponds to a throughput if all machines were reliable (e.g., without random breakdowns) and all buffers' capacities were infinite. As shown, the actual throughput is 34.6 JPH and the nominal throughput is 57.1 JPH, implying a production loss of approximately 39.43%.

Figure 4B:
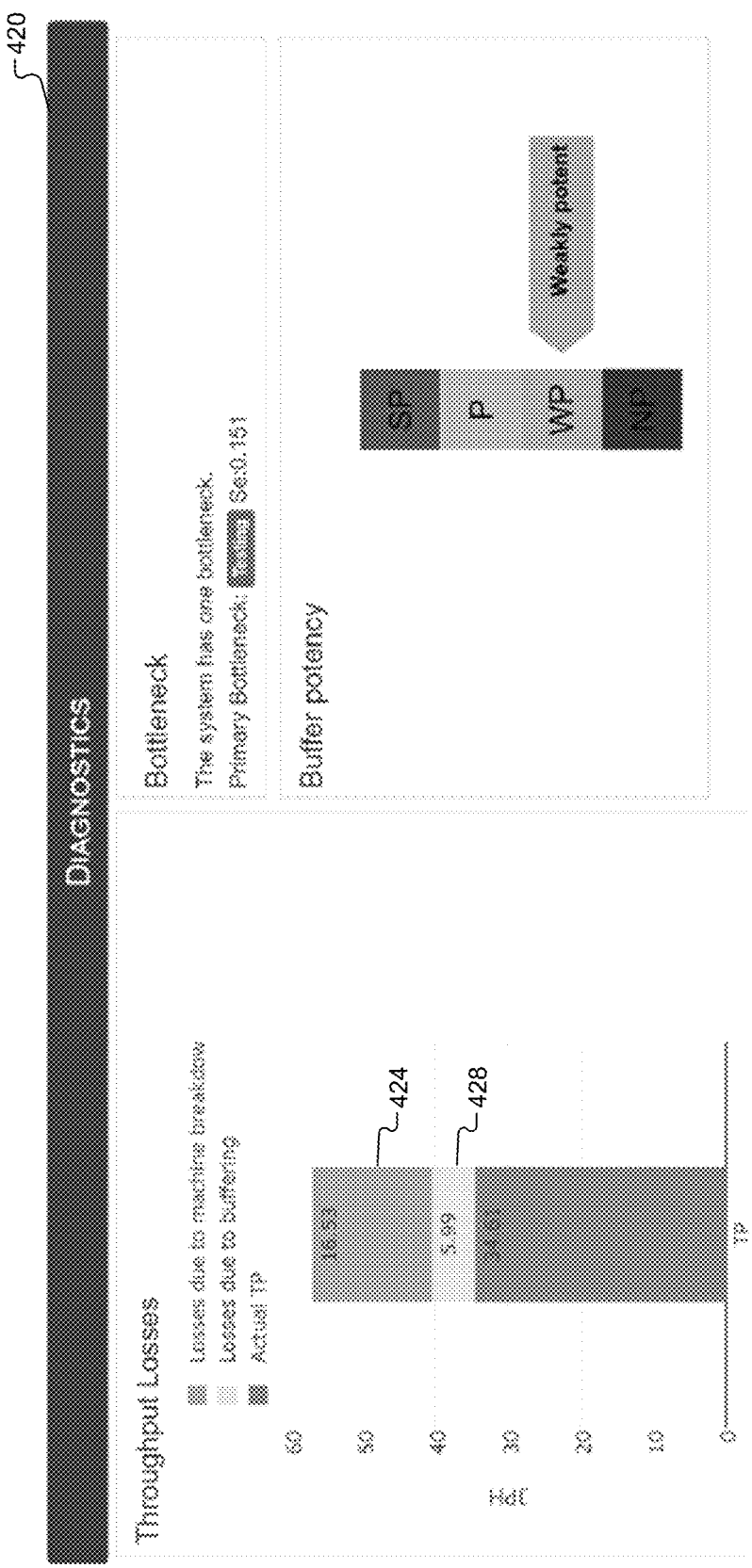
FIG. 4B is an example diagnostics screen of the analytics unit of the PMA.

Referring now to FIG. 4B, an example diagnostics screen 420 of the analytics unit 108 of the PMA 100 is presented. The diagnostics screen 420 presents (e.g., electronically displays) the reasons for throughput loss, such as losses due to machine breakdown 424 and losses due to buffering 428. The losses due to machine breakdown 424 are computed assuming that all machines are reliable. The losses due to buffering 428 are computed assuming that all buffers are infinite. The losses due to machine breakdown 424 are relatively large, while losses due to buffering 428 are small. The diagnostics screen 420 also presents (e.g., electronically displays) a location of a bottleneck. The production system has one bottleneck—located at machine six (e.g., testing operation). The diagnostics screen 420 also presents (e.g., electronically displays) a buffer potency. The buffer is weakly potent (WP) if the bottleneck of the machine is the worst machine in the production system (e.g., the machine with the smallest efficiency); potent (P) if the buffering is weakly potent and the production rate of the system is close to the stand-alone throughput of the bottleneck machine; strongly potent (SP) if the buffering is potent and the system has the smallest possible total buffer capacity necessary to ensure this throughput; otherwise, the buffer is not potent (NP).

Figure 4C:
FIG. 4C is an example what-if analysis screen of the analytics unit of the PMA.

Referring now to FIG. 4C, an example what-if analysis screen 432 of the analytics unit 108 of the PMA 100 is presented. The what-if analysis screen 432 presents (e.g., electronically displays) the effects of changing the machine parameters and buffer parameters. The effects of decreasing the bottleneck machine downtime is illustrated. As illustrated, if MTTR of machine six (e.g., testing operation) is changed from 124 seconds to 30 seconds, the throughput increases almost linearly from 34.6 JPH to 40 JPH but remains constant after that. This is because the bottleneck switches to machine seven (e.g., packaging operation) and immediately after to machine two (e.g., label attach operation) between approximately 75-85 seconds. As a result, further reduction of MTTR of machine six (e.g., testing operation) results in no throughput improvement. The effects of changing cycle time, MTBF, and buffer capacity may be explored similarly using the corresponding buttons. The what-if analysis screen 432 is intended to assist the operations manager 114 in formulating various options for admissible action space, as described below in FIG. 5A.

Figure 4D:
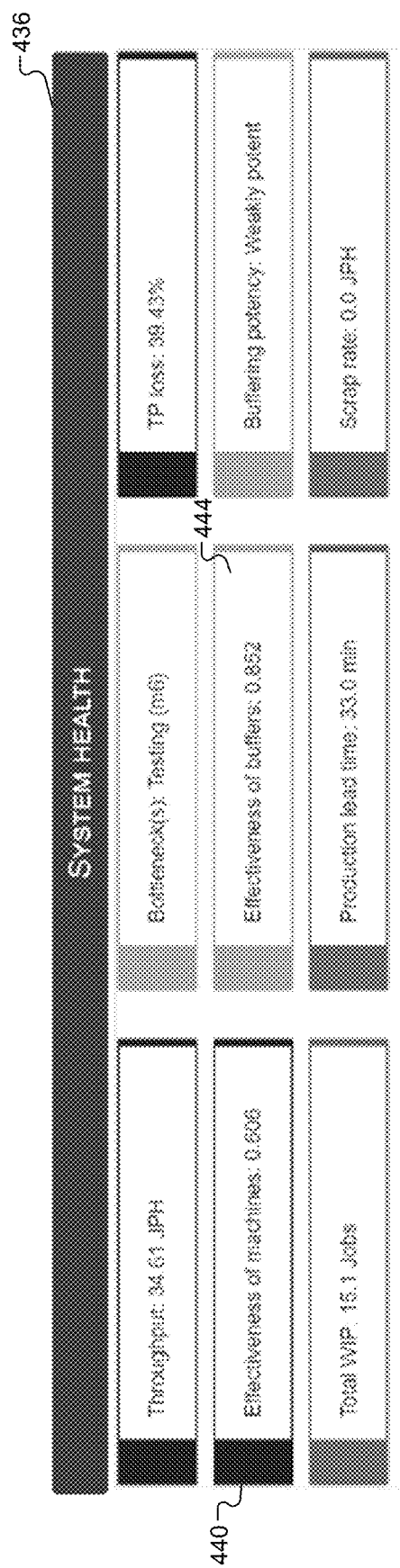
FIG. 4D is an example system health screen of the analytics unit of the PMA.

Referring now to FIG. 4D, an example system health screen 436 of the analytics unit 108 of the PMA 100 is presented. The system health screen 436 presents (e.g., electronically displays) a summary of the production system performance. The system health screen 436 may include an effectiveness of machines 440 and an effectiveness of buffers 444. The effectiveness of machines 440 may be calculated by dividing the actual throughput by throughput of the production system without machine breakdowns. The effectiveness of buffers 444 may be calculated by dividing the actual throughput by throughput of the production system with infinite buffers. The system health screen 436 is intended to assist the operations manager 114 in formulating various options for desired productivity improvement, as described below. In this particular example, the most effective way to improve production system performance is to decrease machine downtimes, for example, by introducing priorities in skilled trade workers.

Referring now to FIG. 5A, an example managerial input screen of an optimization unit 110 of the PMA 100 is presented. The operations manager 114 may create one or more scenarios that correspond to an improvement of the performance metric by modifying the parameters. Each scenario includes a desired productivity improvement 504 and an admissible action space 508. The operations manager 114 may enter a desired value of the performance metric in the desired productivity improvement 504. For example, the operations manager 114 has entered a desired value of 37 JPH for throughput. Along with the performance metrics, the operations manager 114 may improve lead time, leanness of the production system, and/or product quality. Additionally or alternatively, the operations manager 114 may minimize/maximize the performance metric by placing constraints on the parameters in the admissible action space 508. For example, the operations manager 114 may seek to increase throughput to 37 JPH by placing a constraint to reduce MTTR of at most one machine by 15%. The operations manager 114 may save each scenario.

Referring now to FIG. 5B, an example summary of scenarios screen of the optimization unit 110 of the PMA 100 is presented. The summary of scenarios screen provides a list of the saved scenarios. Scenario one corresponds to the scenario shown in the example of FIG. 5A. In scenario two, the goal is to increase throughput to 37 JPH under the constraints on reduction of MTTR and cycle time. The goal of scenario three and four is to maximize throughput. In scenario three, one of the seven machines could be rebuilt, eliminating the machine's breakdown. In scenario four, a skilled trade worker could be assigned to service the production system, in addition to the skilled trade worker already in place.

Figure 6:
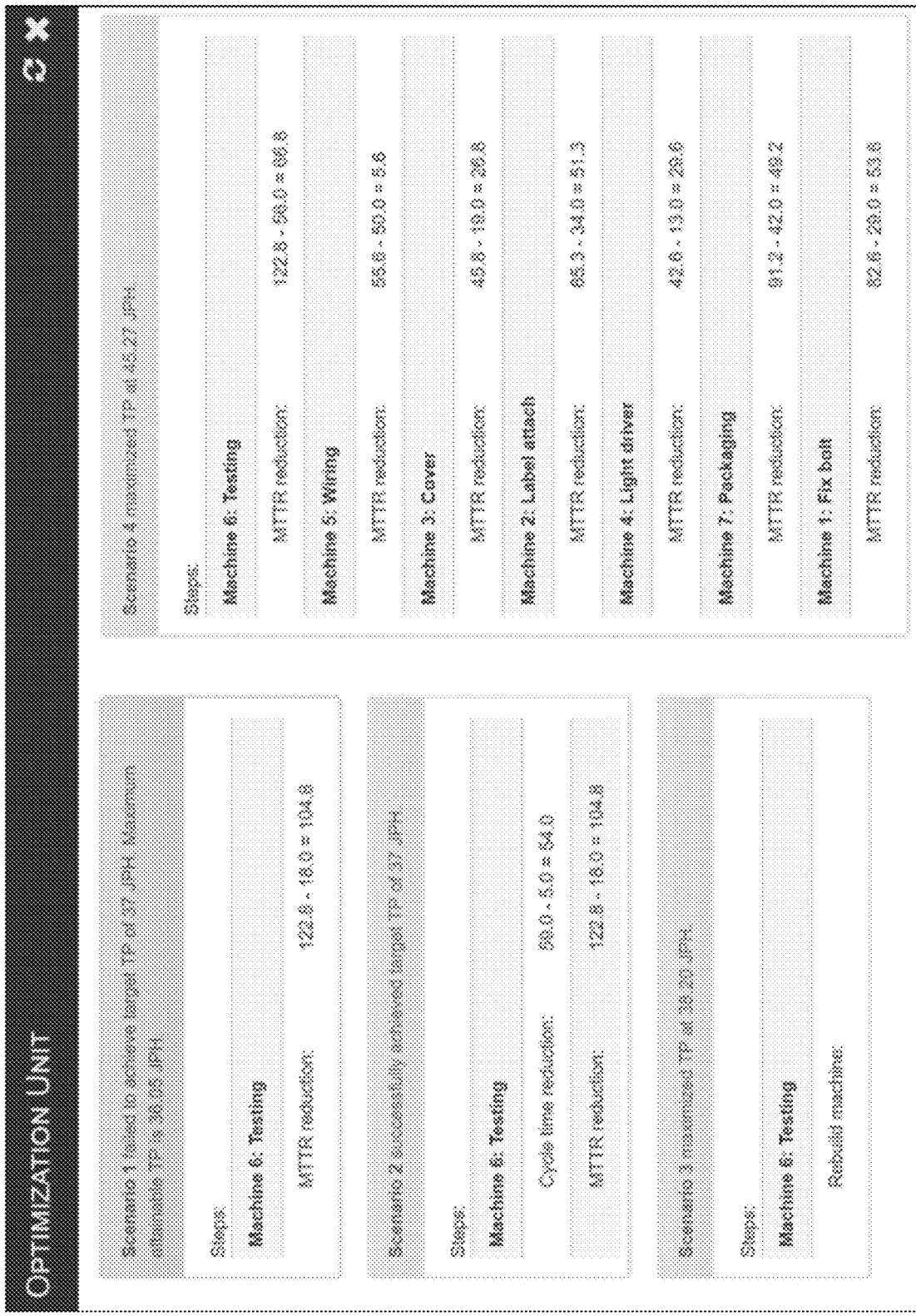
FIG. 6 is an example optimization unit screen of the PMA.

Referring now to FIG. 6, an example optimization unit output screen of an optimization unit 110 of the PMA 100 is presented. The optimization unit output screen presents (e.g., electronically displays) a summary of whether the goal of each scenario can be achieved. For each scenario, a list of steps (or actions) is presented to the operations manager 114. The list of steps (or actions) indicate a target value for a particular parameter of a given operation in the plurality of operations, as described in scenario two below. In scenario one, the desired throughput of 37 JPH cannot be achieved with a 15% reduction of any machine MTTR. Scenario two provides that if, in addition to scenario one, the cycle time of a machine can be reduced by 5%, the desired throughput can be achieved. For example, reducing MTTR of machine six (e.g., testing operation) by 18 seconds and reducing the cycle time by 5 seconds results in a throughput of 37 JPH. In scenario three, throughput is maximized if machine six (e.g., testing operation) is rebuilt, resulting in a throughput of approximately 38.2 JPH. In scenario four, the optimal allocation to reduce total MTTR results in a throughput of approximately 45.27 JPH (e.g., approximately 30% throughput improvement).

Figure 7:
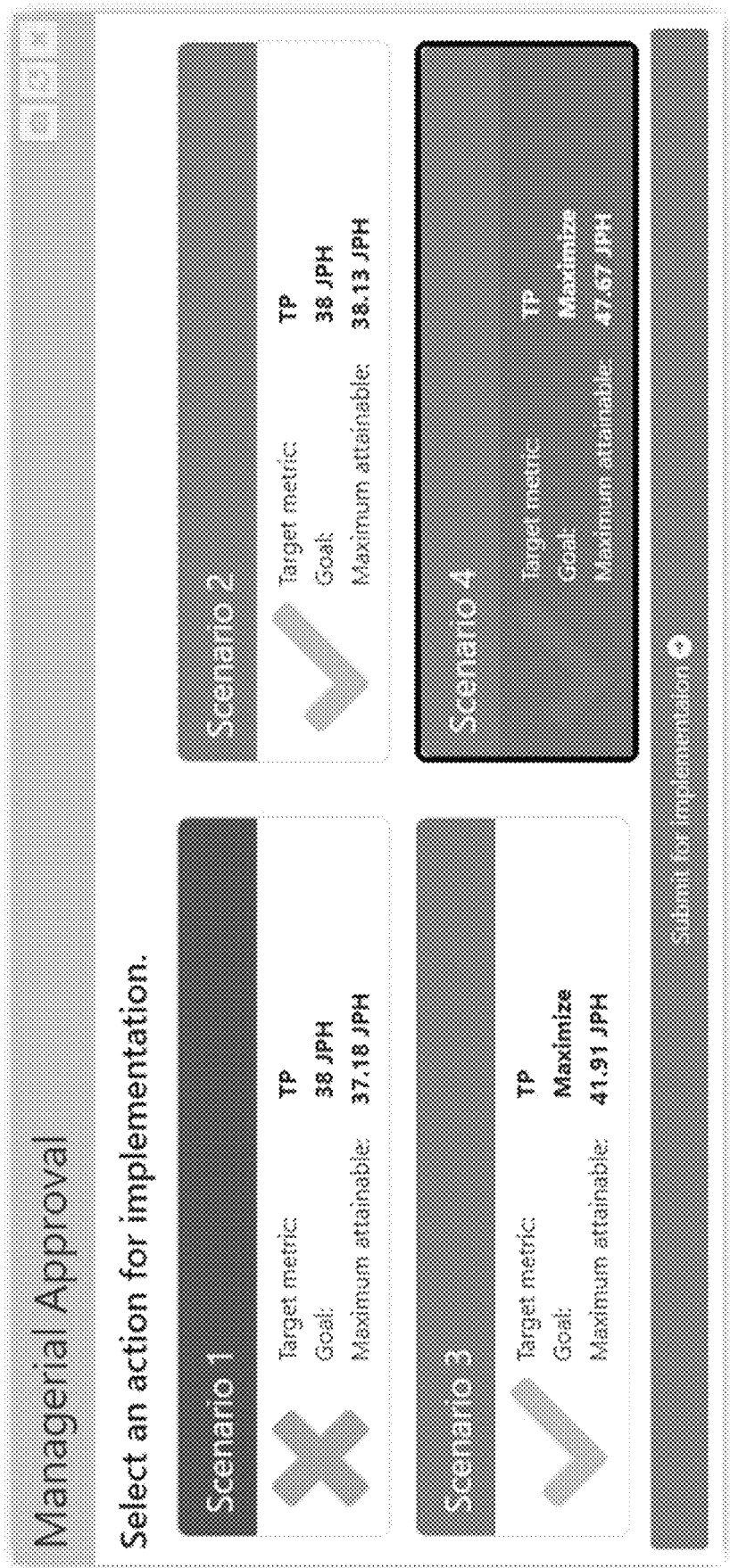
FIG. 7 is an example managerial approval screen of the PMA.

Referring now to FIG. 7, an example managerial approval screen of the optimization unit 110 of the PMA 100 is presented. The managerial approval screen allows the operations manager 114 to select a particular improvement scenario, evaluated by the optimization unit, to implement on the factory floor. For example, the operations manager 114 may decide to select the particular scenario based on engineering, financial, and/or business information available to the operations manager 114. Once selected, an implementation team, such as the implementation team 118, may execute the selected scenario. For example, the implementation team may reconfigure a particular machine by rebuilding the machine, adjusting machine cycle time, assigning skilled trade worker priority, modifying raw materials release policy, etc. Scenario four will be submitted for implementation, as shown by the highlight.

Referring now to FIG. 8, an example measured productivity improvement screen of the PMA 100 is presented. The measured productivity improvement screen presents (e.g., electronically displays) the performance improvement obtained by a discrete-event simulation of the improved production system and compares it with that predicted by the PMA 100. In terms of throughput improvement, the predicted and measured values are close to each other. Within each scenario, the predicted and measured throughputs vary by approximately 3-5% which is within the predetermined target range and the mathematical model is validated.

Figure 12:
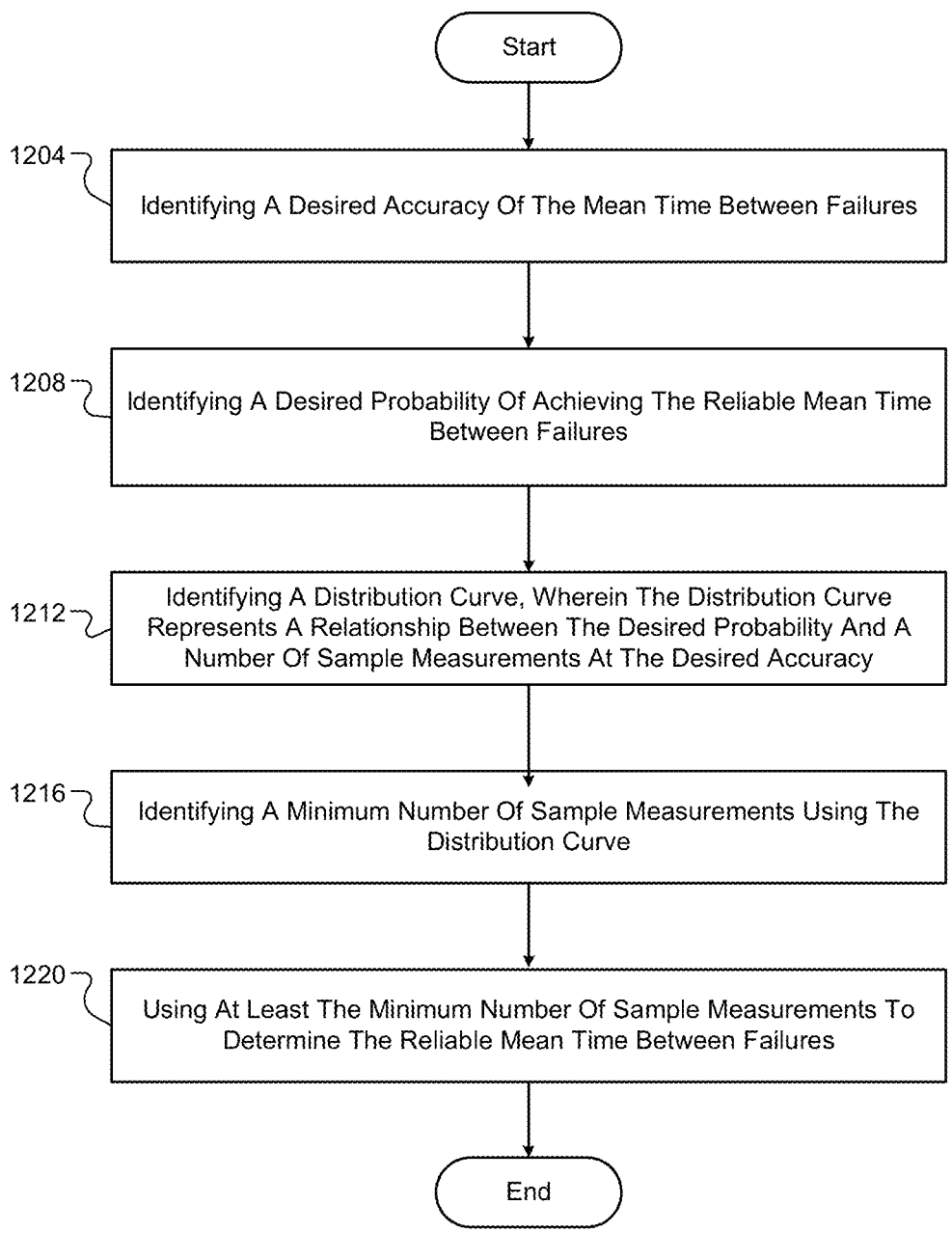
FIG. 12 is a flowchart illustrating an exemplary method for determining a reliable mean time between failures.

Turning now to FIG. 12, a method for determining a reliable mean time between failures is presented. The example method shown in FIG. 12 describes methodology for determining a reliable mean time between failures but the principles described below and shown in FIG. 12 can be applied to reliably determine any suitable performance metric including throughput, production rate, work-in-process, blockage probability, starvation probability, lead time, and starvation rate. Further information regarding the method of FIG. 12 is found in Alavian, Pooya, et al. "9th International Conference MIM." The (Alpha, Beta)-Precise Estimates of MTBF and MTTR: Definitions, Calculations, and Induced Effect on Machine Efficiency Evaluation, 2019, pp. 1-6, the contents of which are incorporated herein by reference.

As can be appreciated, the evaluation of the production system, as described above, can rely on the reliability of the performance metrics that are used by the PMA 100. The use of reliable performance metrics can increase the likelihood that the recommended performance improvements will deliver actual performance improvements. It is desirable, therefore, to determine reliable performance metrics.

The method begins at 1204 where control identifies a desired accuracy of the mean time between failures. Such desired accuracy can be identified by the operations manager 114, for example. The desired accuracy can be input into the PMA 100, in one example, using a user input screen or other device. In one example, the desired accuracy is expressed as a percentage of the performance metric such as ±5%, ±10%, or the like.

At 1208, control identifies a desired probability of achieving the reliable mean time between failures at the desired accuracy. Such desired probability can be identified by the operations manager 114, for example. The desired probability can be input into the PMA 100, in one example, using a user input screen or other device. In one example, the desired probability is expressed as a number between zero and one, such as for example 0.8, 0.85, 0.9, or 0.95.

At 1212, control identifies a distribution curve that represents a relationship between the desired probability and a number of samples at the desired accuracy. Such distribution curves can be created or retrieved from a suitable database, for example.

At 1216, a minimum number of sample measurements is identified using the distribution curve identified at 1212. The minimum number of sample measurements indicates a minimum number of actual measurements that should be used to reliably determine the mean time between failures (or other performance metric). At 1220, the minimum number of sample measurements identified at 1216 is used to determine the reliable mean time between failures.

In one example, the PMA 100 can use this method to determine one or more of the performance metrics. In this manner, the PMA 100 can determine reliable performance metrics based on actual measurements of the production system 200 when it creates and validates the mathematical model of the production system 200. The PMA 100 can continuously and automatically update and re-validate the mathematical model of the production system 200 using reliable performance metrics to increase the likelihood that the recommended performance improvements will deliver the anticipated performance improvements.

In this application, including the definitions below, the terms "unit," "module" or the term "controller" may be replaced with the term "circuit." The terms "module," "unit," and/or "PMA" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The PMA and/or its components may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term "code", as used above, may include software, firmware, and/or microcode, and may refer to programs, routines, functions, classes, data structures, and/or objects. The term "shared processor circuit" encompasses a single processor circuit that executes some or all code from multiple modules. The term "group processor circuit" encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term "shared memory circuit" encompasses a single memory circuit that stores some or all code from multiple modules. The term "group memory circuit" encompasses a memory circuit that, in combination with additional memories, stores some or all code from one or more modules.

The term "memory circuit" is a subset of the term "computer-readable medium." The term "computer-readable medium," as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc™).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A manufacturing system comprising:
   multiple machines each configured to perform at least one of a plurality of operations of a manufacturing process to manufacture at least one component of a product;
   multiple buffers each configured to perform at least one of the plurality of operations of the manufacturing process;
   multiple sensors each configured to measure operation parameters of at least one of the multiple machines and buffers in real-time;
   at least one controller configured to turn on and turn off the multiple machines and the multiple buffers to operate the manufacturing process;
   a programmable manufacturing advisor, implemented at least in part on a processor circuit and a memory circuit, which automatically calculates and presents to an operations manager recommended actions for achieving a desired productivity improvement for the manufacturing process, the programmable manufacturing advisor comprising:
   an information unit that electronically receives measurements of a plurality of parameters from the multiple sensors, the plurality of parameters indicating a productivity of each operation of the plurality of operations in the manufacturing process;
   an analytics unit that, based on the measurements of the plurality of parameters, calculates a baseline value of a performance metric indicating the productivity of the manufacturing process; and
   an optimization unit that:
   determines a recommended improvement action using one or more artificial intelligence (AI) optimization algorithms by:
   (a) identifying a bottleneck in the plurality of operations;
   (b) for one operation of the plurality of operations corresponding to the bottleneck, identifying a parameter from the plurality of parameters that improves the performance metric;
   (c) adjusting a value of the identified parameter by a first step size;
   (d) predicting the value of the performance metric using the adjusted value of the identified parameter;
   (e) repeating steps (a)-(d) until the predicted value of the performance metric or a difference between the predicted and baseline values of the performance metric reaches a predetermined performance metric threshold; and
   (f) determining the recommended improvement action based on the adjusted value of the identified parameter that causes the predicted value of the performance metric or the difference between the predicted and baseline values of the performance metric to reach the predetermined performance metric threshold;
   electronically controls a display to continuously and automatically present the recommended improvement action to the operations manager based on receiving real-time sensed changes to operation of the manufacturing process; and
   facilitates reconfiguring operation of at least one of the multiple machines and buffers according to the recommended improvement action,
   wherein, according to the recommended improvement action, the at least one controller is configured to perform at least one of reducing a cycle time of at least one of the multiple machines to increase a jobs per hour throughput of the machine, increasing a raw materials release rate of at least one of the multiple machines, or increasing a buffer capacity of at least one of the multiple buffers.

2. The manufacturing system of claim 1, wherein the optimization unit predicts the performance metric based on the adjusted value of the identified parameter using a mathematical model of the manufacturing process.

3. The manufacturing system of claim 2, wherein the information unit automatically validates the mathematical model of the manufacturing process by:
   determining a modeled value of the performance metric using the mathematical model of the manufacturing process;
   determining an actual value of the performance metric using the received measurements;
   comparing the modeled value of the performance metric to the actual value of the performance metric; and
   adjusting the mathematical model of the manufacturing process until a difference between the modeled value of the performance metric and the actual value of the performance metric is within a predetermined target range.

4. The manufacturing system of claim 1, wherein each parameter of the plurality of parameters is a parameter selected from a group consisting of cycle time, mean time between failures, and mean time to repair.

5. The manufacturing system of claim 1, wherein the information unit electronically communicates with a measurement database, the measurement database electronically receiving measurement data from at least one sensor.

6. The manufacturing system of claim 1, wherein the performance metric includes at least one of a throughput, a blockage probability, a starvation probability, a work-in-process, and a lead time.

7. The manufacturing system of claim 1, wherein the analytics unit automatically determines diagnostics information for the manufacturing process based on the received measurements and presents the diagnostics information to the operations manager, wherein the diagnostics information includes at least one of throughput losses, location of a bottleneck operation, and buffer potency.

8. The manufacturing system of claim 1, wherein the optimization unit electronically receives an indication of an admissible action space from the operations manager and limits the recommended improvement action to an action bounded by the admissible action space, wherein the admissible action space includes a limitation of the plurality of parameters.

9. The manufacturing system of claim 1, wherein identifying the bottleneck in the plurality of operations includes:
   for each operation in the plurality of operations, identifying a blockage probability of a particular operation in the plurality of operations;
   for each operation in the plurality of operations, identifying a starvation probability of the particular operation in the plurality of operations; and
   determining that the bottleneck is at a selected operation in the plurality of operations when (i) the blockage probability of a preceding operation is greater than the starvation probability of the selected operation and (ii) the blockage probability of the selected operation is less than the starvation probability of a subsequent operation.

10. The manufacturing system of claim 1, wherein the information unit determines a reliable mean time between failures by:
    identifying a desired accuracy of the mean time between failures;
    identifying a desired probability of achieving the mean time between failures at the desired accuracy;
    identifying a distribution curve, wherein the distribution curve represents a relationship between the desired probability and a number of sample measurements at the desired accuracy;
    identifying a minimum number of sample measurements using the distribution curve; and
    using at least the minimum number of sample measurements to determine the mean time between failures.

11. The manufacturing system of claim 1, wherein the optimization unit identifies the parameter that improves the performance metric by:
    (g) adjusting the value of one parameter of the plurality of parameters by a second step size;
    (h) computing the performance metric based on the adjusted value of the one parameter using a mathematical model of the manufacturing process;
    (i) repeating steps (g) and (h) for the remaining parameters of the plurality of parameters; and
    (j) determining which parameter of the plurality of parameters is most effective in changing the performance metric.

12. The manufacturing system of claim 1, wherein the optimization unit:
    electronically receives an indication of an admissible action space from a user input screen, the admissible action space including a maximum allowable range for the plurality of parameters; and
    limits the second step size of each parameter of the plurality of parameters to maintain that parameter within its maximum allowable range.

13. The manufacturing system of claim 1, wherein the optimization unit determines the recommended improvement action in real time as changes occur to the manufacturing process.

14. A method of determining a productivity improvement action to achieve a desired productivity improvement for a manufacturing process, the method comprising:
    electronically receiving measurements for a plurality of parameters indicating a productivity of each operation of a plurality of operations in the manufacturing process, the manufacturing process including multiple machines and buffers, each of the plurality of operations corresponding to operation of at least one of the multiple machines and buffers, and the measurements received via multiple sensors each configured to measure operation parameters of at least one of the multiple machines and buffers in real-time;
    determining a baseline value of a performance metric indicating the productivity of the manufacturing process using the measurements of the plurality of parameters;
    determining a recommended improvement action using one or more artificial intelligence (AI) optimization algorithms by:
        (a) identifying a bottleneck in the plurality of operations;
        (b) for one operation of the plurality of operations corresponding to the bottleneck, identifying a parameter from the plurality of parameters that improves the performance metric;
        (c) adjusting a value of the identified parameter by a first step size;
        (d) predicting the value of the performance metric using the adjusted value of the identified parameter; and
        (e) repeating steps (a)-(d) until the predicted value of the performance metric or a difference between the predicted and baseline values of the performance metric reaches a predetermined performance metric threshold; and
        (f) determining the recommended improvement action based on the adjusted value of identified parameter that causes the predicted value of the performance metric or the difference between the predicted and baseline values of the performance metric to reach the predetermined performance metric threshold; and
    according to the recommended improvement action, perform at least one of reducing a cycle time of at least one of the multiple machines to increase a jobs per hour throughput of the machine, increasing a raw materials release rate of at least one of the multiple machines, or increasing a buffer capacity of at least one of the multiple buffers.

15. The method of claim 14, further comprising predicting the value of the performance metric based on the adjusted value of the identified parameter using a mathematical model of the manufacturing process.

16. The method of claim 15, further comprising validating the mathematical model of the manufacturing process by:
    determining a modeled value of the performance metric using the mathematical model of the manufacturing process;
    determining an actual value of the performance metric using the received measurements;
    comparing the modeled value of the performance metric to the actual value of the performance metric; and
    adjusting the mathematical model of the manufacturing process until a difference between the modeled value of the performance metric and the actual value of the performance metric is within a predetermined target range.

17. The method of claim 14, wherein each parameter of the plurality of parameters is a parameter selected from the group consisting of cycle time, mean time between failures and mean time to repair.

18. The method of claim 14, wherein the performance metric includes at least one of a throughput, a blockage probability, a starvation probability, a work-in-process, and a lead time.

19. The method of claim 14, further comprising automatically determining diagnostics information for the manufacturing process based on the received measurements and electronically displaying the diagnostics information, wherein the diagnostics information includes at least one of throughput losses, location of a bottleneck operation, and buffer potency.

20. The method of claim 14, further comprising electronically receiving an indication of an admissible action space and limiting the recommended improvement action to an action bounded by the admissible action space, wherein the admissible action space includes a limitation of the plurality of parameters.

21. The method of claim 14, wherein identifying the bottleneck in the plurality of operations includes:
  for each operation in the plurality of operations, identifying a blockage probability of a particular operation in the plurality of operations;
  for each operation in the plurality of operations, identifying a starvation probability of the particular operation in the plurality of operations; and
  determining the bottleneck at a selected operation in the plurality of operations when (i) the blockage probability of a preceding operation is greater than the starvation probability of the selected operation and (ii) the blockage probability of the selected operation is less than the starvation probability of a subsequent operation.

22. The method of claim 14, further comprising identifying the parameter that improves the performance metric by:
  (g) adjusting the value of one parameter of the plurality of parameters by a second step size;
  (h) computing the performance metric based on the adjusted value of the one parameter using a mathematical model of the manufacturing process;
  (i) repeating steps (g) and (h) for the remaining parameters of the plurality of parameters; and
  (j) determining which parameter of the plurality of parameters is most effective in changing the performance metric.

23. The method of claim 22, further comprising:
  electronically receiving an indication of an admissible action space, the admissible action space including a maximum allowable range for the plurality of parameters; and
  limiting the second step size of each parameter of the plurality of parameters to maintain that parameter within its maximum allowable range.

24. The method of claim 14 further comprising determining the recommended improvement action in real time as changes occur to the manufacturing process.

25. A method of determining a productivity improvement action to achieve a desired productivity improvement for a manufacturing process, the method comprising:
  electronically receiving measurements for at least one parameter indicating a productivity of each operation of a plurality of operations in the manufacturing process, the manufacturing process including multiple machines and buffers, each of the plurality of operations corresponding to operation of at least one of the multiple machines and buffers, and the measurements received via multiple sensors each configured to measure operation parameters of at least one of the multiple machines and buffers in real-time;
  generating a mathematical model of the manufacturing process based on the measurements of the at least one parameter;
  determining a recommended improvement action using one or more artificial intelligence (AI) optimization algorithms by:
    (a) identifying a bottleneck in the plurality of operations;
    (b) for one operation of the plurality of operations corresponding to the bottleneck, adjusting a value of the at least one parameter by a first step size;
    (c) predicting the value of a performance metric indicating the productivity of the manufacturing process based on the adjusted value of the at least one parameter using the mathematical model of the manufacturing process; and
    (d) repeating steps (a)-(c) until the predicted value of the performance metric reaches a predetermined performance metric threshold; and
    (e) determining the recommended improvement action based on the adjusted value of the at least one parameter that causes the predicted value of the performance metric to reach the predetermined performance metric threshold; and
  according to the recommended improvement action, perform at least one of reducing a cycle time of at least one of the multiple machines to increase a jobs per hour throughput of the machine, increasing a raw materials release rate of at least one of the multiple machines, or increasing a buffer capacity of at least one of the multiple buffers.

26. The method of claim 25, further comprising generating the mathematical model of the manufacturing process by:
  determining a modeled value of the performance metric using the mathematical model of the manufacturing process;
  determining an actual value of the performance metric using the received measurements;
  comparing the modeled value of the performance metric to the actual value of the performance metric; and
  adjusting the mathematical model of the manufacturing process until a difference between the modeled value of the performance metric and the actual value of the performance metric is within a predetermined target range.

27. The method of claim 25 wherein:
  the at least one parameter includes a plurality of parameters;
  the method further comprises identifying a parameter from the plurality of parameters that improves the performance metric; and
  step (b) of the method includes, for the one operation corresponding to the bottleneck, adjusting the value of the identified parameter by the first step size.

* * * * *